United States Patent
Hirata

(10) Patent No.: US 10,274,787 B2
(45) Date of Patent: Apr. 30, 2019

(54) LIQUID CRYSTAL DISPLAY APPARATUS COMPRISING A PIXEL ELECTRODE HAVING A SECOND OPENING PART DEFLECTED FROM A CENTRAL PORTION BETWEEN TWO LIQUID CRYSTAL DOMAINS

(71) Applicant: Sakai Display Products Corporation, Sakai-shi, Osaka (JP)

(72) Inventor: Mitsuaki Hirata, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/320,295

(22) PCT Filed: Apr. 17, 2015

(86) PCT No.: PCT/JP2015/061862
§ 371 (c)(1),
(2) Date: Dec. 19, 2016

(87) PCT Pub. No.: WO2016/166886
PCT Pub. Date: Oct. 20, 2016

(65) Prior Publication Data
US 2017/0205670 A1    Jul. 20, 2017

(51) Int. Cl.
*G02F 1/1337* (2006.01)
*G02F 1/1343* (2006.01)

(52) U.S. Cl.
CPC .. *G02F 1/133788* (2013.01); *G02F 1/133707* (2013.01); *G02F 1/133753* (2013.01);
(Continued)

(58) Field of Classification Search
CPC ........ G02F 2001/133742; G02F 2001/133757; G02F 1/133753
See application file for complete search history.

(56) References Cited

U.S. PATENT DOCUMENTS

2003/0043336 A1    3/2003  Sasaki et al.
2007/0269936 A1*  11/2007  Tanaka ................ G02F 1/13458
                                              438/133
(Continued)

FOREIGN PATENT DOCUMENTS

| JP | 2003-149647 A | 5/2003 |
| WO | WO2006132369 A1 | 12/2006 |
| WO | WO2013054828 A1 | 4/2013 |

*Primary Examiner* — Paul C Lee
(74) *Attorney, Agent, or Firm* — Rudy J. Ng; Bret E. Field; Bozicevic, Field & Francis LLP

(57) ABSTRACT

The present disclosure provides a liquid crystal display apparatus having a reduced area of a dark line occurring when light is transmitted through a pixel region, and excellent transmittance of light and image quality. The liquid crystal display apparatus includes: two substrates each of which has an electrode and a photo alignment film sequentially formed on one surface and one surfaces of which face to each other; a liquid crystal layer which includes a vertical alignment type liquid crystal material, and is interposed between both photo alignment films; a plurality of pixel regions formed on the substrates in a matrix in a planar direction of the substrates; at least two liquid crystal domains which are included in each pixel region, and have different standard alignment directions defined by the photo alignment films; main slits which are formed in regions corresponding to each liquid crystal domain of one electrode, and extend parallel to each standard alignment direction, and sub slits extending between two liquid crystal domains, which are arranged in one direction, in the other direction orthogonal to the one direction. The sub slit has a width of a width or more of the main slit.

4 Claims, 39 Drawing Sheets

(52) U.S. Cl.
CPC .............. *G02F 1/134309* (2013.01); *G02F 2001/133742* (2013.01); *G02F 2001/133757* (2013.01); *G02F 2201/123* (2013.01)

(56) References Cited

U.S. PATENT DOCUMENTS

| | | | |
|---|---|---|---|
| 2009/0284703 | A1 | 11/2009 | Shoraku et al. |
| 2010/0149464 | A1* | 6/2010 | Han ................ G02F 1/133512 349/106 |
| 2012/0154703 | A1* | 6/2012 | Yoshida ........... G02F 1/133753 349/43 |
| 2012/0206683 | A1* | 8/2012 | Zhang .................. G02F 1/1343 349/139 |
| 2013/0215341 | A1* | 8/2013 | Rho ................ G02F 1/134309 349/15 |
| 2014/0253853 | A1 | 9/2014 | Yoshida et al. |

\* cited by examiner

LIQUID CRYSTAL DISPLAY APPARATUS COMPRISING A PIXEL ELECTRODE HAVING A SECOND OPENING PART DEFLECTED FROM A CENTRAL PORTION BETWEEN TWO LIQUID CRYSTAL DOMAINS

CROSS-REFERENCE TO RELATED APPLICATIONS

This application is the national phase under 35 U.S.C. § 371 of PCT International Application No. PCT/JP2015/061862 which has an International filing date of Apr. 17, 2015 and designated the United States of America.

FIELD

The present invention relates to a liquid crystal display apparatus included in a television receiver, a personal computer or the like.

BACKGROUND

Among display apparatuses, a liquid crystal display apparatus is a thin type display and has characteristics such as low power consumption. A display panel of the liquid crystal display apparatus has a color filter (CF) substrate, a liquid crystal layer, an active matrix substrate (TFT substrate), and two polarizing plates. The CF substrate and the active matrix substrate are bonded to each other with a seal material interposed therebetween, and liquid crystal is arranged therebetween to form the liquid crystal layer. The active matrix substrate has pixel electrodes on the liquid crystal layer side, and the CF substrate has common electrodes on the liquid crystal layer side. The two polarizing plates are disposed on a surface opposite to the liquid crystal layer side of each of the CF substrate and the active matrix substrate.

The liquid crystal display apparatus using a vertical alignment type material as a liquid crystal material is called a vertical alignment (VA) mode liquid crystal display apparatus. The liquid crystal display apparatus, in order to improve transmittance and response speed thereof, has an alignment division structure in which a plurality of liquid crystal domains are formed in one pixel. As a method of forming the alignment division structure, there may be a multi-domain vertical alignment (MVA) mode. In the MVA mode, an alignment regulation structure is obtained by providing a linear projection on the liquid crystal layer side of the substrate which sandwiches the liquid crystal layer, and providing an opening part (slit) on the pixel electrode. By the alignment regulation structure, a plurality of liquid crystal domains are formed in the pixel (for example, Japanese Patent Laid-open Publication No. 2003-149647). By finely forming the slit, an alignment of the liquid crystal molecules may be more controlled, and the transmittance of light and response speed may be improved.

The VA mode, which is configured in such a manner that alignment films such as a photo alignment film are respectively provided on the liquid crystal layer sides of both substrates facing each other with the liquid crystal layer interposed therebetween so that pre-tilt directions (alignment treatment directions) are orthogonal to each other, and the liquid crystal molecules have a twist alignment during applying a voltage thereto, is called a vertical alignment twisted nematic (VATN) mode (for example, International Publication No. 2006/132369). Among them, a structure, in which four liquid crystal domains which are divided into two rows and two columns during applying a voltage thereto are formed in one pixel region, by defining the pre-tilt directions using the two alignment films, is called a 4D structure.

FIG. 36 is a plan view illustrating a pixel region of the VATN mode liquid crystal display apparatus having the 4D structure.

In FIG. 36, dotted line arrows illustrate pre-tilt directions which are defined by the photo alignment film provided on the active matrix substrate, and solid line arrows illustrate pre-tilt directions which are defined by the photo alignment film provided on the CF substrate. In addition, a tilt direction (standard alignment direction) of each liquid crystal domain when a voltage is applied to the liquid crystal layer is illustrated by a direction of pins. FIG. 36 illustrates that the liquid crystal molecules are tilted so that circular plate parts (head parts) of the pins are close to a viewer who views the liquid crystal display apparatus. That is, the standard alignment direction is oblique 45°. As described above, liquid crystal domains A, B, C and D are formed.

The pixel electrode of the liquid crystal display apparatus has no slit formed therein.

FIG. 37 is a plan view illustrating a light transmission state of the pixel region in FIG. 36. FIG. 37 illustrates a state in which a wiring and a contact hole are disposed. The contact hole is formed in a central part of the pixel region.

From FIG. 37, it can be seen that dark lines having a wide width are generated along a short side of the pixel region and a boundary between the liquid crystal domains. In the short side of the pixel region, the liquid crystal molecules are inclined in an orientation inward and perpendicular to the short side, and in the vicinity of the short side of the pixel region, the head parts of the liquid crystal molecules inclined on the short side and the liquid crystal molecule aligned in the tilt direction face each other, as well as the direction of the liquid crystal molecules is disturbed, and the liquid crystal molecules are bent in a direction perpendicular or parallel to the polarizing axes, such that a region through which the light is not transmitted occurs. In the boundary between the liquid crystal domains, tilt angles on both sides of the boundary are 90° different from each other. Therefore, the liquid crystal molecules are aligned with being bent in a direction perpendicular to the boundary (a direction perpendicular or parallel to polarizing axes), and thereby a wide region through which the light is not transmitted occurs.

The transmittance of light is decreased by the dark lines. Particularly, in a high definition display having small pixels, the effect of a decrease in transmittance of light by the dark lines becomes larger.

Assembling the above-described MVA mode in the VATN mode having a 4D structure has also been attempted (for example, International Publication No. 2013/054828 and the like).

FIG. 38 is a plan view illustrating a pixel electrode of the active matrix substrate in the pixel region of a liquid crystal display apparatus of International Publication No. 2013/054828.

Four liquid crystal domains of the pixel electrode respectively have a group of slits 21 which extend in each tilt direction of oblique 45° formed therein. By the slits 21, the above-described dark lines generated at the boundary portion between the liquid crystal domains of the VATN mode are reduced, and thus the transmittance of light may be increased. A contact hole 12 is formed in the central part of the pixel region.

FIG. 39 is a plan view illustrating the light transmission state of the pixel region in FIG. 38. FIG. 39 illustrates a state in which the wiring and the contact hole are disposed.

Also in this structure, it can be seen that dark lines having a constant width are formed at the boundary portion, and a sufficient effect may not be obtained. In addition, the dark lines along the slits 21 also occur.

SUMMARY

In consideration of the above-described circumstances, it is an object of the present disclosure to provide a liquid crystal display apparatus which has a reduced area of a dark line occurring when light is transmitted through a pixel region, and excellent transmittance of light and image quality.

Means for Solving Problems

According to an aspect of the present disclosure, a liquid crystal display apparatus comprises: two substrates each of which has an electrode and a photo alignment film sequentially formed on one surface and one surfaces of which face to each other; a liquid crystal layer which includes a vertical alignment type liquid crystal material, and is interposed between both photo alignment films; a plurality of pixel regions formed on the substrate in a matrix in a planar direction of the substrate; at least two liquid crystal domains which are included in each pixel region, and have different standard alignment directions defined by the photo alignment films; and a plurality of first opening parts which are formed in regions corresponding to each liquid crystal domain of one electrode, and extend parallel to each standard alignment direction, wherein the one electrode has a second opening part extending in a direction orthogonal to one direction, between two liquid crystal domains which are arranged in the one direction, and the second opening part has a width of a width or more of the first opening part.

According to the present disclosure, since the one electrode has the second opening parts, liquid crystal molecules lining up at an angle of 45° along a longitudinal edge part of the second opening part collide with each other and are horizontally tilted, and the number of the liquid crystal molecules aligned in the tilt direction is increased, and thereby a region in which the liquid crystal molecules are present becomes wider. That is, the alignment of the liquid crystal molecules in one side portion of the pixel region is not disturbed, and is aligned. As a result, a dark line occurring at the one side portion of the pixel region is shifted to the one side, and thereby transmittance of light of the liquid crystal display apparatus is improved. When the second opening part has a width less than the width of the first opening part, the liquid crystal molecules lining up along both longitudinal edge parts of the second opening part less affect each other, and as described above, the number of the liquid crystal molecules aligned in the tilt direction is not increased, as well as the dark line occurring in the one side portion of the pixel region is not shifted to the one side, and thereby the transmittance is not improved.

The liquid crystal display apparatus according to the present disclosure has excellent transmittance of light, thereby having excellent image quality.

In the liquid crystal display apparatus, the second opening part may have a width of an interval or less between the two substrates.

According to the present disclosure, since the second opening part has a width of the width or more of the first opening part, and a width of the interval or less between the two substrates, by the second opening part, it is possible to control a direction of the liquid crystal molecules at a central portion in a thickness direction of the liquid crystal layer. In addition, when the second opening part has a width exceeding the interval, the liquid crystal molecules lining up along both longitudinal edge parts of the second opening part collide with each other and fall horizontally, and the number of the liquid crystal molecules aligned in a direction in which the second opening part extends, not the tilt direction, is increased, such that the dark line occurs at a boundary portion between the liquid crystal domains.

In the liquid crystal display apparatus, the one electrode may have a third opening part extending in the one direction between two liquid crystal domains which are arranged in the direction orthogonal to the one direction, and the third opening part may have a width of the width or more of the first opening part.

According to the present disclosure, since the one electrode has the third opening parts, the liquid crystal molecules lining up at an angle of 45° along a longitudinal edge part of the third opening part collide with each other and are horizontally tilted, and the number of the liquid crystal molecules aligned in the tilt direction is increased, and thereby the region in which the liquid crystal molecules are present becomes wider. That is, the alignment of the liquid crystal molecules in the other side portion of the pixel region is not disturbed, and is aligned. As a result, the dark line occurring at the other side portion of the pixel region when light is transmitted through the pixel region is more shifted to the other side, and thereby the liquid crystal display apparatus has excellent transmittance of light.

When the third opening part has a width less than the width of first opening part, the liquid crystal molecules lining up along both longitudinal edge parts of the third opening part less affect each other, and as described above, the number of the liquid crystal molecules aligned in the tilt direction is not increased, as well as the dark line occurring in the other side portion of the pixel region is not shifted to the other side, and thereby the transmittance is not improved.

The liquid crystal display apparatus according to the present disclosure has excellent transmittance of light, thereby having excellent image quality.

In the liquid crystal display apparatus, the third opening part may have a width of the interval or less between the two substrates.

According to the present disclosure, since the third opening part has a width of the width or more of the first opening part, and a width of the interval or less between the two substrates, by the third opening part, it is possible to control the direction of the liquid crystal molecules at the central portion in the thickness direction of the liquid crystal layer. In addition, when the third opening part has a width exceeding the interval, the liquid crystal molecules lining up along both longitudinal edge parts of the third opening part collide with each other and fall horizontally, and the number of the liquid crystal molecules aligned in a direction in which the third opening part extends, not the tilt direction, is increased, such that the dark line occurs at a boundary portion between the liquid crystal domains.

In the liquid crystal display apparatus, the second opening part and the third opening part may be provided at positions deflected from a central portion between the corresponding two liquid crystal domains.

According to the present disclosure, by providing the second opening part and the third opening part corresponding to the portions occurring the dark lines, an occurrence of the dark lines is efficiently suppressed.

According to the present disclosure, since the one electrode has the second opening parts extending between two liquid crystal domains, which are arranged in one direction, in the other direction orthogonal to the one direction, and the second opening part has a width of the width or more of the first opening part, the number of the liquid crystal molecules aligned in the tilt direction is increased, and thereby the region in which the liquid crystal molecules are present becomes wider. That is, an area of the dark lines occurring when light is transmitted through the pixel region is reduced, and thereby the liquid crystal display apparatus has excellent transmittance of light and image quality.

The above and further objects and features will more fully be apparent from the following detailed description with accompanying drawings.

DETAILED DESCRIPTION

Hereinafter, the present disclosure will be described in detail with reference to the accompanying drawings illustrating embodiments thereof.

Embodiment 1

Figure 1:
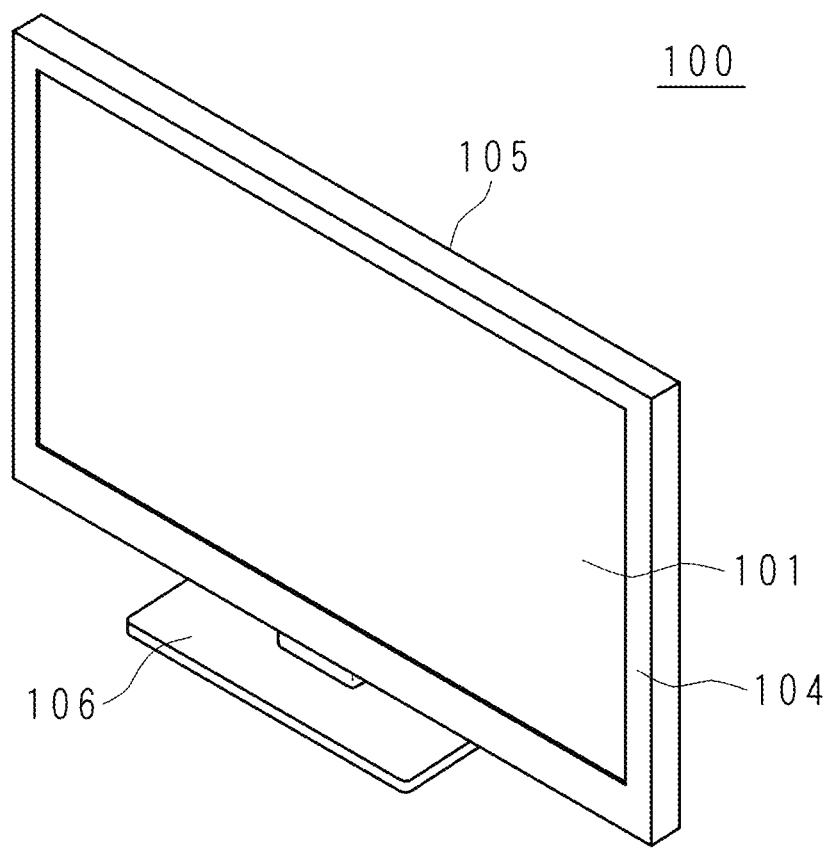
FIG. 1 is a perspective view illustrating an appearance of a liquid crystal display apparatus according to Embodiment 1 of the present disclosure.
Figure 2:
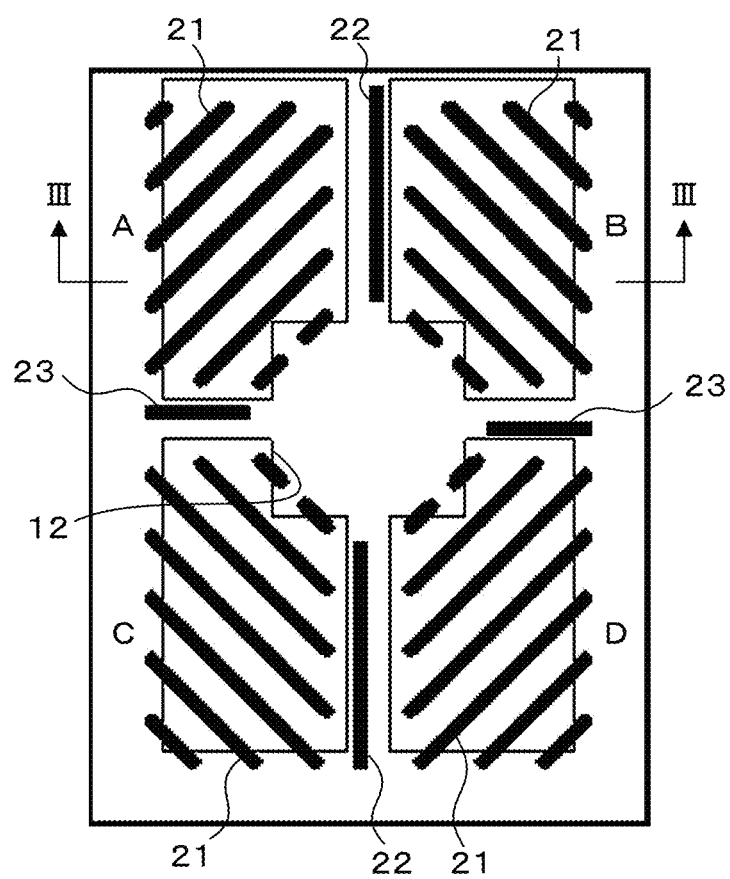
FIG. 2 is a plan view illustrating a pixel electrode in one pixel region of a display panel of the liquid crystal display apparatus.
Figure 3:
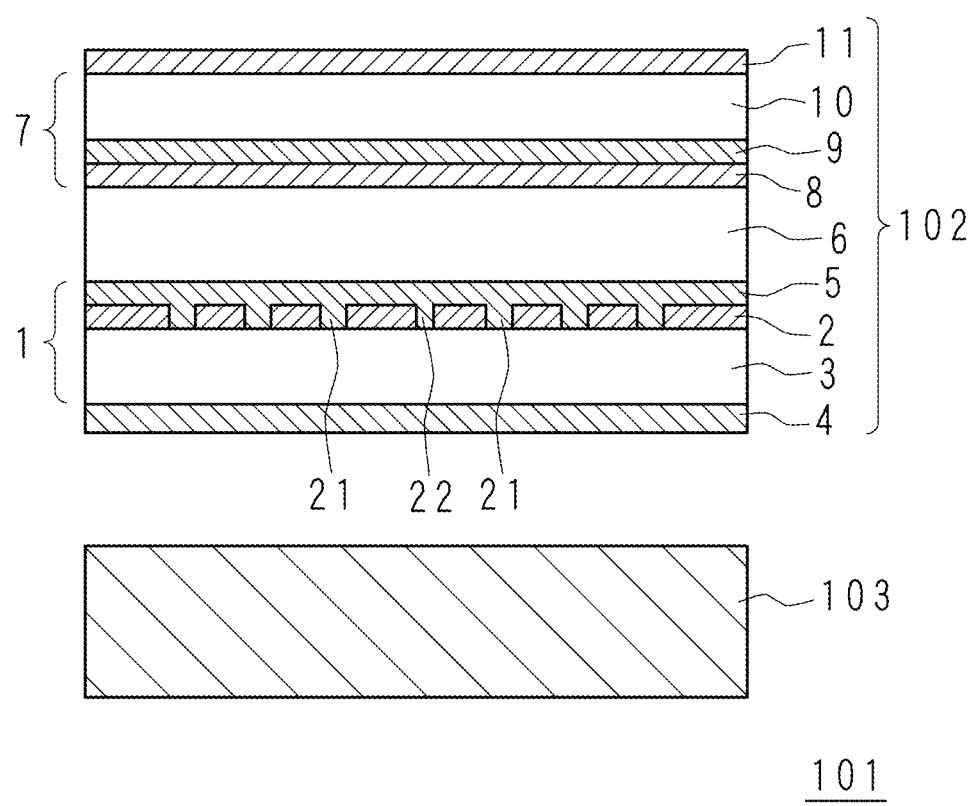
FIG. 3 is a cross-sectional view of a display module taken on line III-III of FIG. 2.
Figure 4:
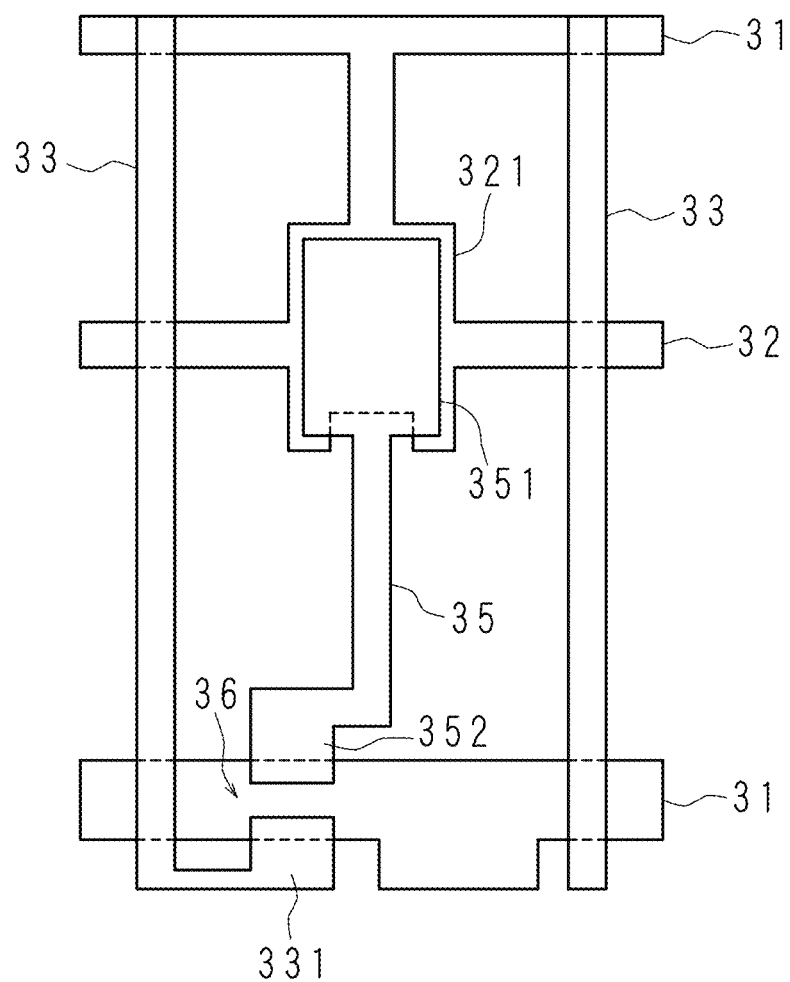
FIG. 4 is a plan view illustrating a wiring of an active matrix substrate.

FIG. 1 is a perspective view illustrating an appearance of a liquid crystal display apparatus 100 according to Embodiment 1 of the present disclosure, FIG. 2 is a plan view illustrating a pixel electrode 2 in one pixel region of a display panel 102 of the liquid crystal display apparatus 100, FIG. 3 is a cross-sectional view of a display module 101 taken on line III-III of FIG. 2, and FIG. 4 is a plan view illustrating a wiring of an active matrix substrate 1.

The liquid crystal display apparatus 100 includes the display module 101 having the display panel 102 and a backlight unit 103, a front cabinet 104 and a rear cabinet 105 which are made of a synthetic resin and house the display module 101 so as to sandwich it therebetween, and a stand 106. The display module 101 is formed in a laterally long substantially rectangular shape as a whole, and housed in the front cabinet 104 and the rear cabinet 105 in a vertical position.

The display panel 102 according to Embodiment 1 has a plurality of pixel regions disposed in a matrix in a planar direction.

The display panel 102 is a multi-domain VATN mode display panel. As illustrated in FIG. 2, four liquid crystal domains A (the first domain), B (the second domain), C (the third domain) and D (the fourth domain) of a pixel electrode 2 of the active matrix substrate 1 respectively have a group of main slits 21 which are formed therein in rounded corner rectangular shape, and extend corresponding to a tilt direction of oblique 45° of each liquid crystal domain.

The main slit 21 has a width of 1.5 μm, and a pitch of 5.5 μm.

In addition, the pixel electrode 2 is provided with longitudinal sub slits 22 and 22 which extend in a column direction at a boundary portion between the liquid crystal domains A and B and a boundary portion between the liquid crystal domains C and D, which are arranged in a row direction, and lateral sub slits 23 and 23 which extend in the row direction at a boundary portion between the liquid crystal domains A and C and at a boundary portion between the liquid crystal domains B and D, which are arranged in the column direction. The sub slits 22 and the sub slits 23 are independent from the main slits 21 without continuing to the main slits 21. An angle formed by the column direction and an axial center of the sub slits 22 is a range of ±5° or less, and an angle formed by the row direction and an axial center of the sub slits 23 is a range of ±5° or less.

The sub slit 22 between the liquid crystal domains A and B is deflected by 1 μm from a central portion between the liquid crystal domains A and B to the liquid crystal domain B side, and the sub slit 22 between the liquid crystal domains C and D is deflected by 1 μm from a central portion between the liquid crystal domains C and D to the liquid crystal domain C side.

The sub slit 23 between the liquid crystal domains A and C is deflected by 1 μm from a central portion between the liquid crystal domains A and C to the liquid crystal domain A side, and the sub slit 23 between the liquid crystal domains B and D is deflected by 1 μm from a central portion between the liquid crystal domains B and D to the liquid crystal domain D side. That is, the sub slits 22 and 23 are deflected to a side (end part of a CF substrate 7 side) in which head parts of the liquid crystal molecules face, briefly, to a portion in which the dark line occurs, at a central part in a thickness direction of a liquid crystal layer 6.

Each of the sub slits 22 and 23 has a width of a width or more of the main slit 21.

In addition, it is preferable that each of the sub slits 22 and 23 has a width of an interval (cell gap) or less between the active matrix substrate 1 and the CF substrate 7.

In FIG. 2, each of the sub slits 22 and 23 has a width of 1.5 μm

The pixel electrode 2 is formed in a state having the main slits 21, the sub slits 22, and the sub slits 23, by forming an ITO film by a sputtering method, and then patterning the same. A contact hole 12 is formed in a central part of the pixel region, and the pixel electrode 2 is also formed on the contact hole 12.

The pixel electrode 2 is electrically connected with a drain electrode 35 by the contact hole 12 as described below. However, if there is no pixel electrode 2 on the contact hole 12, connection therebetween becomes impossible, such that it is necessary for the main slit 21 to be disposed at a constant distance from the contact hole 12. Since an exposure pattern of the contact hole 12 is quadrangle, as illustrated in FIG. 2, the central portion of the main slit 21 near the corner is cut off.

As illustrated in FIG. 3, the display panel 102 of the display module 101 has the active matrix substrate 1, the CF substrate 7, the liquid crystal layer 6, and two polarizing plates 4 and 11. The CF substrate 7 and the active matrix substrate 1 are adhered to each other with a seal material interposed therebetween, and a vertical alignment type liquid crystal material is injected therebetween to form the liquid crystal layer 6. The two polarizing plates 11 and 4 are disposed on a surface opposite to the liquid crystal layer 6 side of each of the CF substrate 7 and the active matrix substrate 1.

A substrate part 3 of the active matrix substrate 1 includes a thin-film transistor (TFT) 36 (see FIG. 4) to be described below, a plurality of gate wirings (scanning wirings) 31 which provide a scanning signal to the TFT 36, and a plurality of source wirings (signal wirings) 33 which provide an image signal to the TFT 36, which are formed on an insulating substrate made of glass, for example.

As illustrated in FIG. 4, the gate wirings 31 and a Cs wiring 32 extend parallel to each other, and the source wirings 33 intersect the gate wirings 31 and the Cs wiring 32, and extend parallel to each other.

The Cs wiring 32 has a drain opposing part 321 formed in a rectangular shape at a central part thereof.

The left source wiring 33 in FIG. 4 is provided with a source electrode 331 formed in a rectangular shape at a lower end part thereof so as to be oriented toward the right source wiring 33.

The drain electrode 35 has a Cs opposing part 351 formed in a smaller rectangular shape than the drain opposing part 321, and a source drain opposing part 352 facing the source electrode 331 in the planar direction.

The drain opposing part 321 of the Cs wiring 32 and the Cs opposing part 351 of the drain electrode 35 face each other with a gate insulation film (not illustrated) interposed therebetween, and an auxiliary capacitor (Cs) is formed in this region.

A gate electrode is formed at a portion nearer the lower gate wiring 31, and the gate electrode, the source electrode 331, and the source drain opposing part 352 form the TFT 36.

The pixel electrode 2 having the above-described main slits 21, the sub slits 22, and the sub slits 23 is formed on the liquid crystal layer 6 side of the substrate part 3, and the pixel electrode 2 is covered with a photo alignment film 5. The drain electrode 35 is electrically connected to the pixel electrode 2 through the contact hole 12.

A substrate part 10 of the CF substrate 7 is formed by arranging a color filter (not illustrated) such as a black matrix (BM), and red (R), green (G), and blue (B) and the like on an insulating substrate made of glass, for example.

A common electrode 9 made of ITO, or the like, for example, is formed on the liquid crystal layer 6 side of the substrate part 10. The common electrode is covered by a photo alignment film 8.

The polarizing plates 4 and 11 are disposed so that the respective polarizing axes are orthogonal to each other.

The backlight unit 103 is disposed on a back side of the display panel 102. The backlight unit 103 may be any one of an edge light type (side light type, or light guide plate type) backlight, and a direct type backlight. In the case of the edge light type backlight, the backlight unit 103 is configured to house an optical sheet, the light guide plate, a light source such as an LED substrate, and the like in a chassis.

EXAMPLES

Hereinafter, examples according to Embodiment 1 will be described in detail, however the present disclosure is not limited to the examples.

(1) When the Cell Gap is 3 μm

Figure 5:
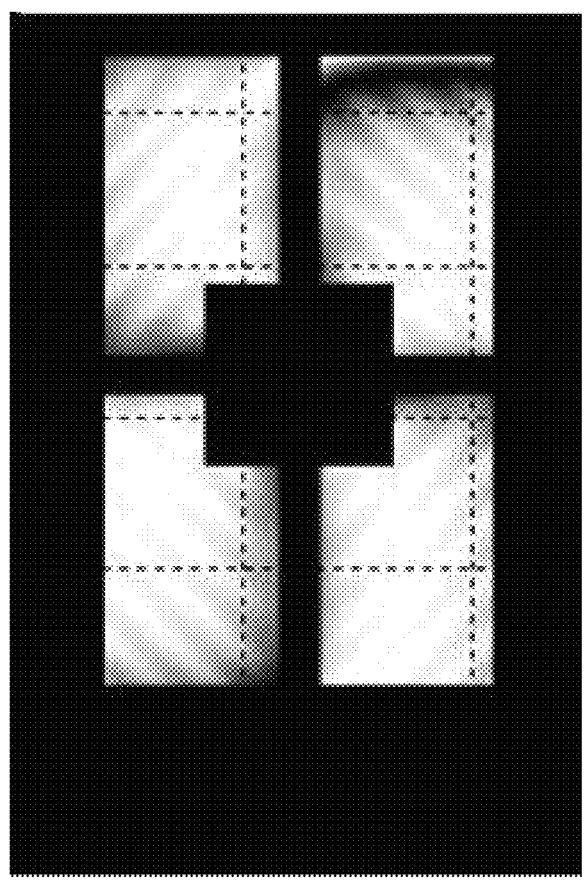
FIG. 5 is a plan view illustrating a light transmission state in one pixel region of an example using the pixel electrode in FIG. 2, of which a sub slit has a width of 1.5 μm when a cell gap is 3 μm.
Figure 6:
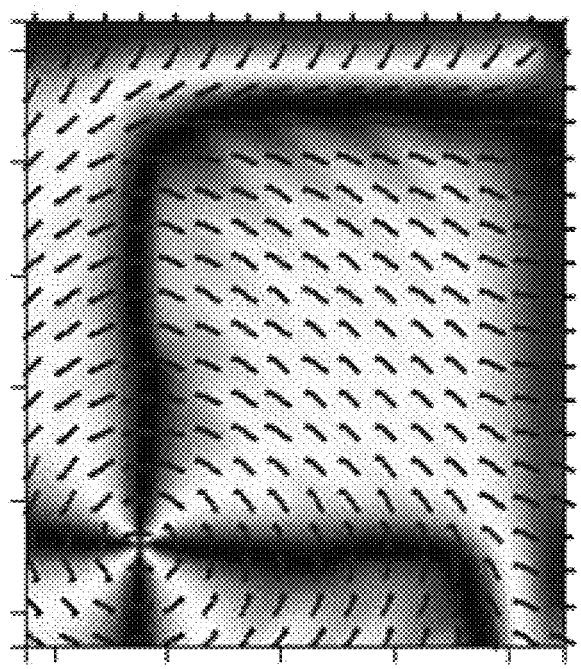
FIG. 6 is an enlarged view illustrating an upper right portion (a portion of a liquid crystal domain B) of FIG. 5.

In the display panel 102 configured as described above, when the distance (cell gap) between the active matrix substrate 1 and the CF substrate 7 is 3 μm, a light transmission state in one pixel region of an example using the above-described pixel electrode 2 in FIG. 2 is illustrated in a plan view of FIG. 5. FIG. 6 is an enlarged view illustrating an upper right portion (portion of the liquid crystal domain B) of FIG. 5. FIG. 5 illustrates a state in which the wiring and the contact hole are disposed, and FIG. 6 illustrates an alignment of the liquid crystal molecules using pins.

As described above, the main slit 21 of FIG. 2 has a width of 1.5 μm, and each of the sub slits 22 and 23 has a width of 1.5 μm.

In the present example, metal wirings (the Cs wiring 32, the gate wirings 31, and the drain electrode 35) of the active matrix substrate 1 are configured to be located on a region of the dark line occurring at the boundary between the liquid crystal domains, thereby suppressing transmission loss of light.

As illustrated in FIG. 6, the liquid crystal molecules are aligned in the tilt direction. By providing the main slit 21, the liquid crystal molecules lining up along a longitudinal edge part of the main slit 21 collide with each other and fall, and are arranged so as to be laid along a direction in which the main slit 21 extends, and thereby an alignment of the liquid crystal molecules is aligned. As a result, it can be confirmed that this effect is larger when the main slit 21 has a narrow width.

In a short side of the pixel region, the liquid crystal molecules are inclined in an orientation inward and perpendicular to the short side, and in the short side portion of the pixel region, the head parts of the liquid crystal molecules inclined on the short side and the liquid crystal molecule aligned in the tilt direction face each other, as well as the direction of the liquid crystal molecules is disturbed, and the liquid crystal molecules are bent in a direction perpendicular or parallel to the polarizing axes, such that a region through which the light is not transmitted occurs.

As described above, in the boundary between the liquid crystal domains, tilt angles on both sides of the boundary are 90° different from each other. Therefore, the liquid crystal molecules are aligned with being bent in a direction perpendicular to the boundary (the direction perpendicular or parallel to the polarizing axes), and thereby a wide region through which the light is not transmitted occurs.

By providing the sub slit 22, the liquid crystal molecules lining up at an angle of 45° along the longitudinal edge part of the sub slit 22 collide with each other and are horizontally tilted, and the number of the liquid crystal molecules in the tilt direction is increased, and thereby a region in which the liquid crystal molecules are present becomes wider. That is, the alignment of the liquid crystal molecules in the short side portion of the pixel region is not disturbed, and is aligned. As a result, a portion of the dark line on the liquid crystal domain boundary side of the short side portion in the above-described pixel region is shifted to the short side of the pixel region.

Similarly, by providing the sub slit 23, the liquid crystal molecules lining up at an angle of 45° along the longitudinal edge part of the sub slit 23 collide with each other and are horizontally tilted, and the number of the liquid crystal molecules in the tilt direction is increased, and thereby a region in which the liquid crystal molecules are present becomes wider. That is, the alignment of the liquid crystal molecules in a long side portion of the pixel region is not disturbed, and is aligned. As a result, a portion of the dark line on the liquid crystal domain boundary side of the long side portion in the pixel region is shifted to the long side of the pixel region.

Figure 37:
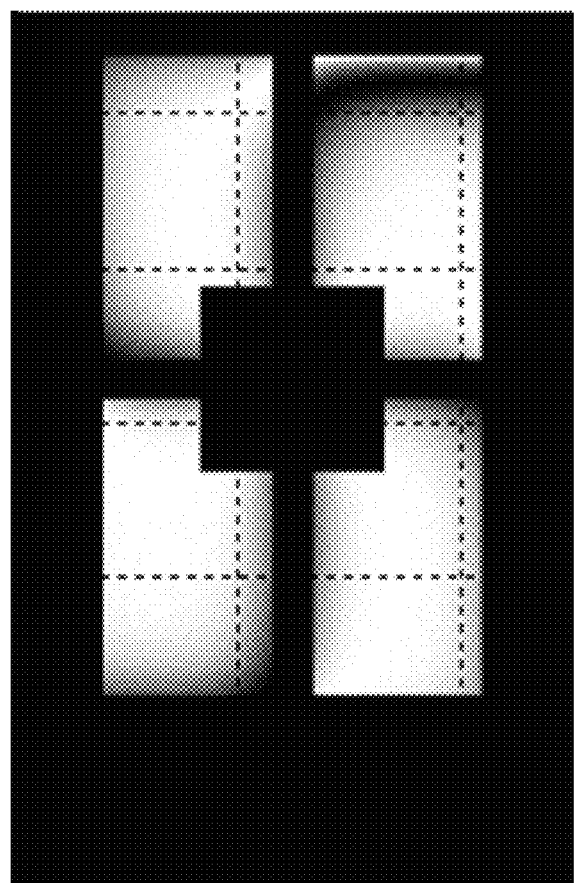
FIG. 37 is a plan view illustrating the light transmission state of the pixel region in FIG. 36.
Figure 38:
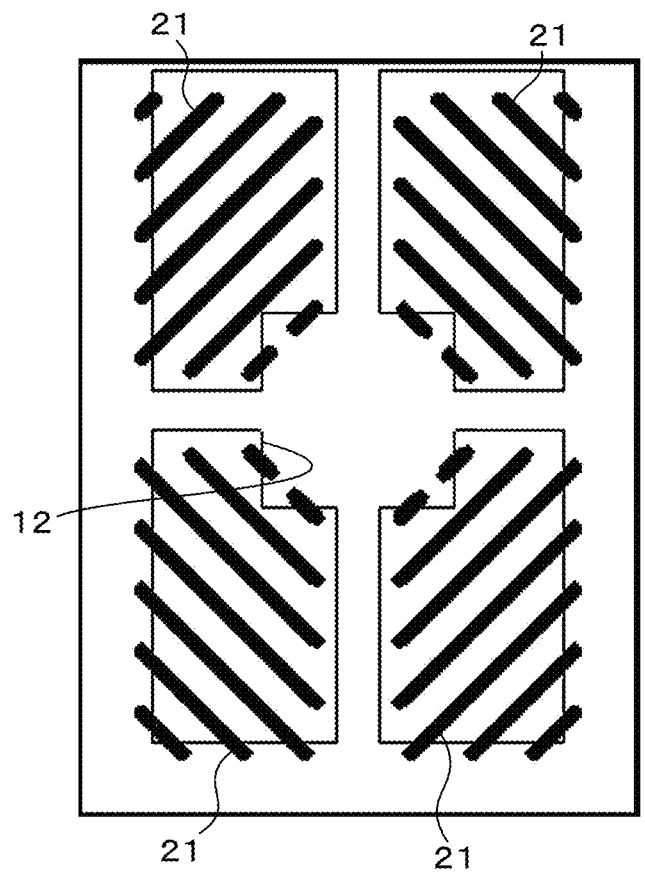
FIG. 38 is a plan view illustrating a pixel electrode of the active matrix substrate in the pixel region of a liquid crystal display apparatus of International Publication No. 2013/054828.

By comparing FIGS. 5 and 6 with the light transmission state in the pixel region of the conventional display panels illustrated in FIG. 37 (without slit: VATN mode) and FIG. 39 (without sub slit), it can be seen that, in the display panel 102 according to the present example, an occurrence of the dark line may be suppressed well.

Figure 39:
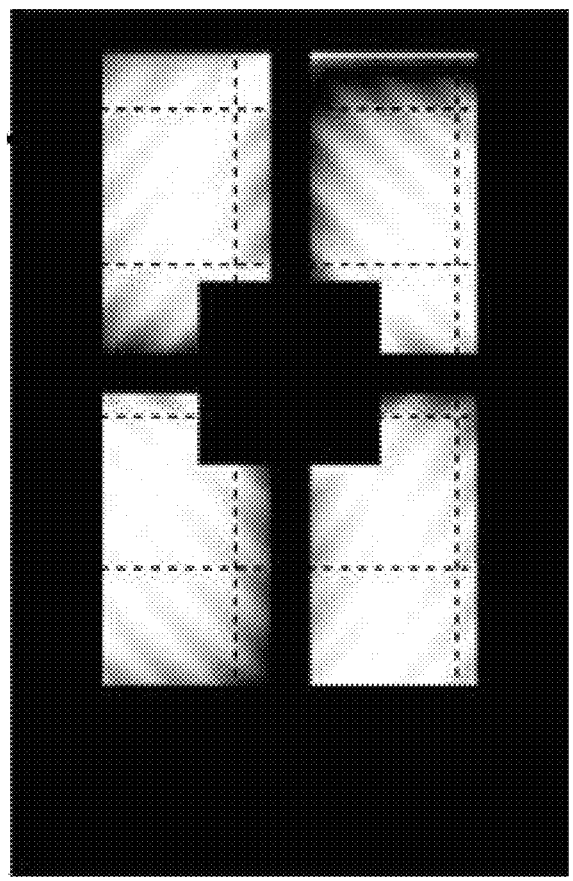
FIG. 39 is a plan view illustrating the light transmission state of the pixel region in FIG. 38.

The following Table 1 illustrates the transmittances of the display panel 102 of the present example and the above-described conventional display panels of FIGS. 37 and 39. Units of a sub slit width and the cell gap are "μm." In addition, Table 2 illustrates the ratio (transmittance ratio) of the transmittance of the display panel of the present example in the case in which the transmittance of display panel of FIG. 37 is set to be 1.00. Further, each of the transmittance ratios of the following examples illustrates a ratio of the transmittance of the display panel of each example in the case in which the transmittance of display panel of the VATN mode in each cell gap is set to be 1.00.

TABLE 1

|  |  | SUB SLIT WIDTH | | | | | NO SLIT | NO SUB |
| --- | --- | --- | --- | --- | --- | --- | --- | --- |
|  |  | 1.5 | 2 | 2.5 | 3 | 4 | 0 | SLIT 0 |
| CELL | 2 | 3.14 | 3.12 | 3.06 | 3.01 | 2.95 | 3.10 | 3.08 |
| GAP | 2.5 | 3.09 | 3.14 | 3.11 | 3.04 | 2.95 | 2.98 | 3.05 |
|  | 3 | 2.95 | 3.04 | 3.06 | 3.02 | 2.91 | 2.80 | 2.93 |

TABLE 2

| | | \multicolumn{5}{c}{SUB SLIT WIDTH} | | | |
|---|---|---|---|---|---|---|
| | | 1.5 | 2 | 2.5 | 3 | 4 |
| CELL GAP | 2 | 1.01 | 1.01 | 0.99 | 0.97 | 0.95 |
| | 2.5 | 1.04 | 1.05 | 1.04 | 1.02 | 0.99 |
| | 3 | 1.05 | 1.08 | 1.09 | 1.08 | 1.04 |

From Table 1, it can be seen that the display panel 102 of the present example has improved transmittance compared to the conventional display panel.

Accordingly, the liquid crystal display apparatus 100 including the display panel 102 has excellent image quality.

Figure 7:
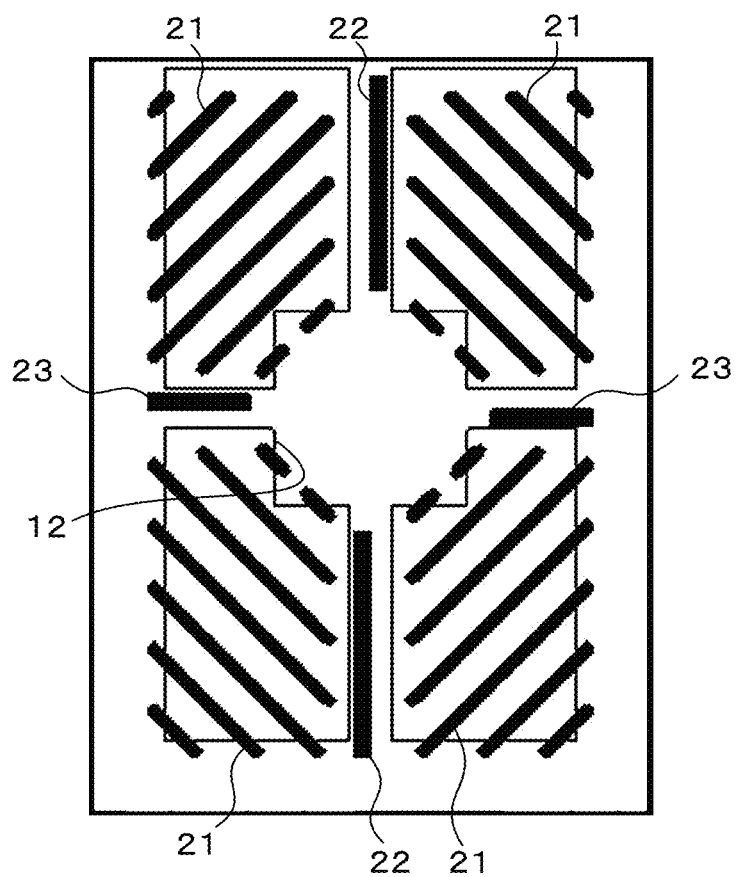
FIG. 7 is a plan view illustrating a pixel electrode in one pixel region of a display panel of an example of which the sub slit has a width of 2 μm.
Figure 8:
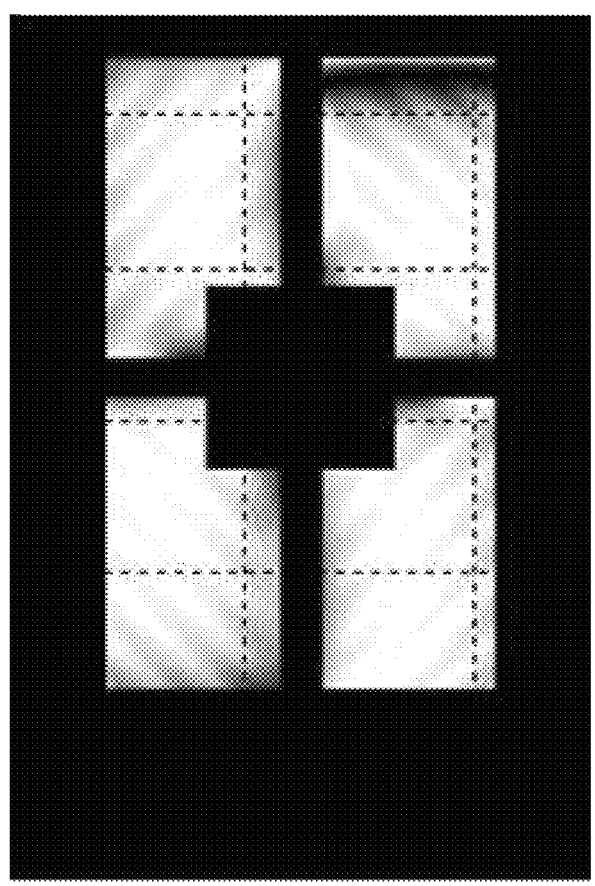
FIG. 8 is a plan view illustrating the light transmission state in the pixel region of the above example.
Figure 9:
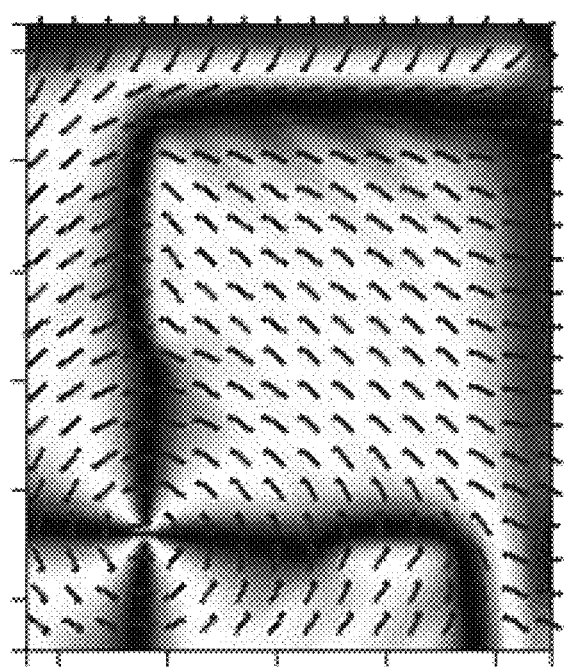
FIG. 9 is an enlarged view illustrating an upper right portion of FIG. 8.

FIG. 7 is a plan view illustrating a pixel electrode 2 in one pixel region of a display panel 102 of an example in which each of the sub slits 22 and 23 has a width of 2 μm, FIG. 8 is a plan view illustrating the light transmission state in the pixel region of the above example, and FIG. 9 is an enlarged view illustrating an upper right portion of FIG. 8.

The transmittance and the transmittance ratio in the above case are illustrated in the above Tables 1 and 2.

Figure 10:
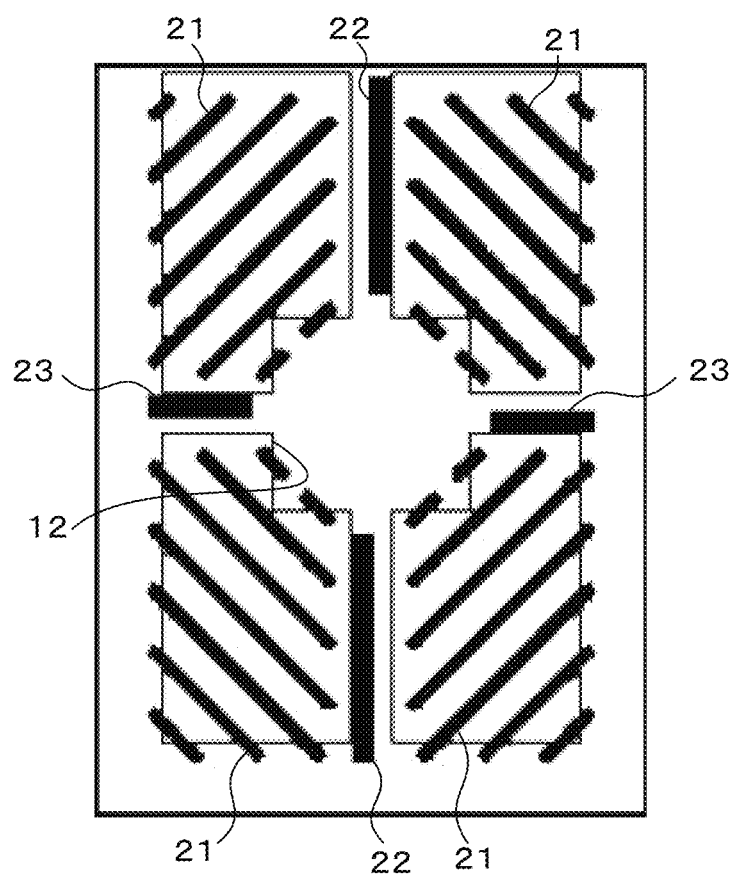
FIG. 10 is a plan view illustrating a pixel electrode in one pixel region of a display panel of an example of which the sub slit has a width of 2.5 μm.
Figure 11:
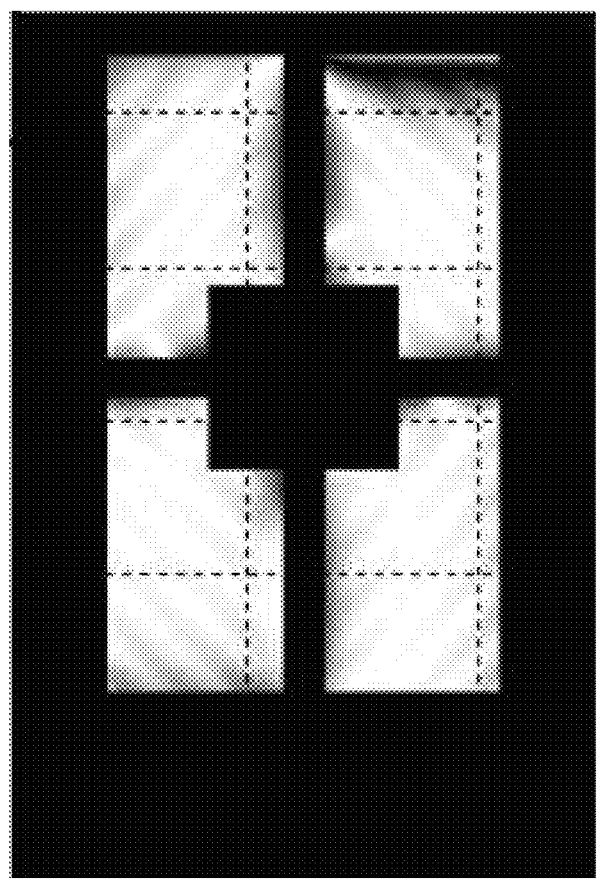
FIG. 11 is a plan view illustrating the light transmission state in the pixel region of the above example.
Figure 12:
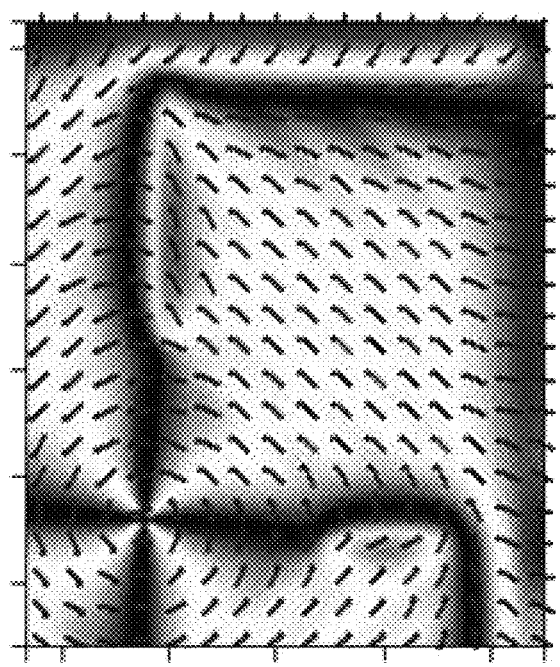
FIG. 12 is an enlarged view illustrating an upper right portion of FIG. 11.

FIG. 10 is a plan view illustrating a pixel electrode 2 in one pixel region of a display panel 102 of an example in which each of the sub slits 22 and 23 has a width of 2.5 μm, FIG. 11 is a plan view illustrating the light transmission state in the pixel region of the above example, and FIG. 12 is an enlarged view illustrating an upper right portion of FIG. 11.

The transmittance and the transmittance ratio in the above cases are illustrated the above Tables 1 and 2.

Figure 13:
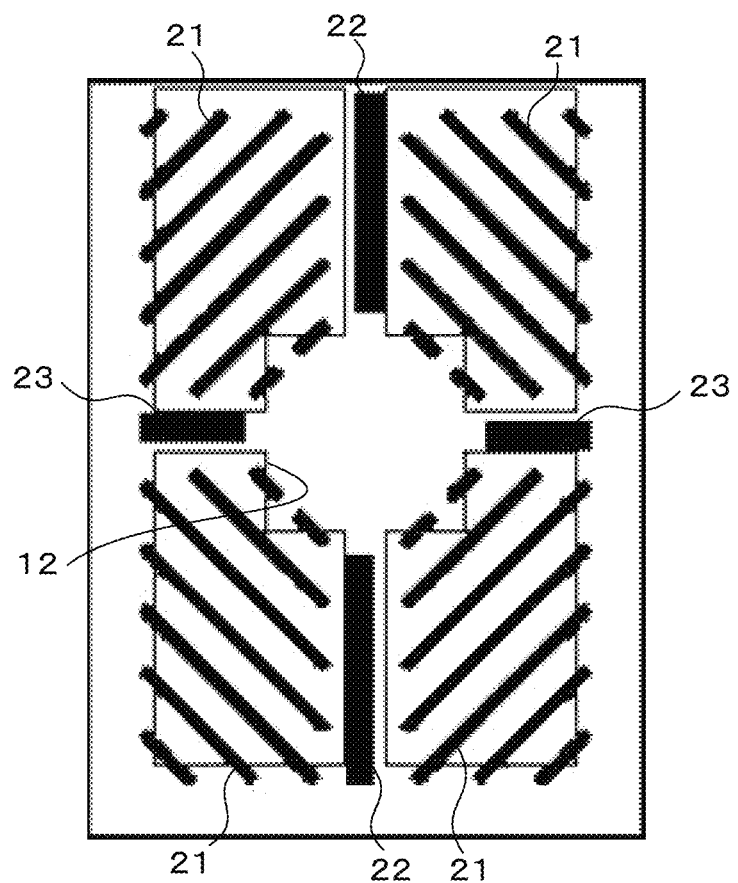
FIG. 13 is a plan view illustrating a pixel electrode in one pixel region of a display panel of an example of which the sub slit has a width of 3 μm.
Figure 14:
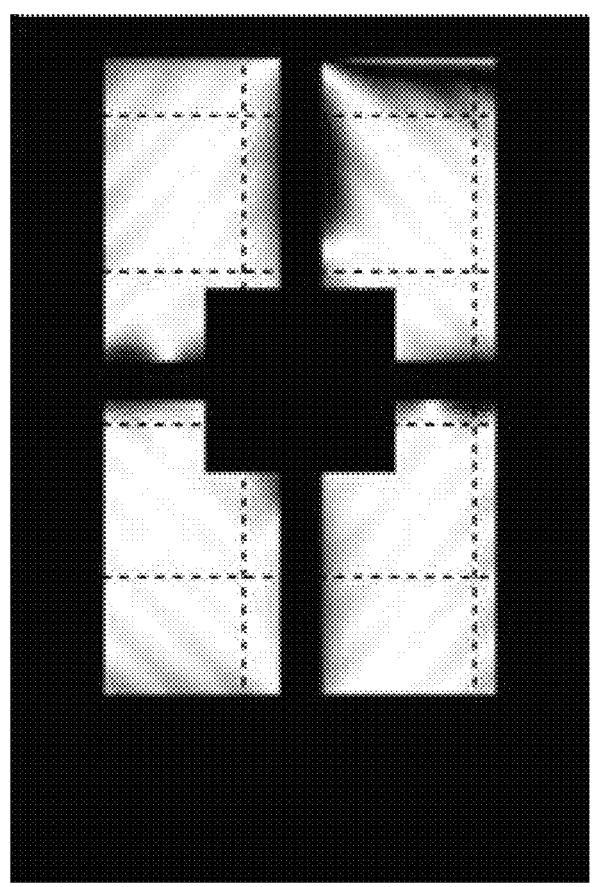
FIG. 14 is a plan view illustrating the light transmission state in the pixel region of the above example.
Figure 15:
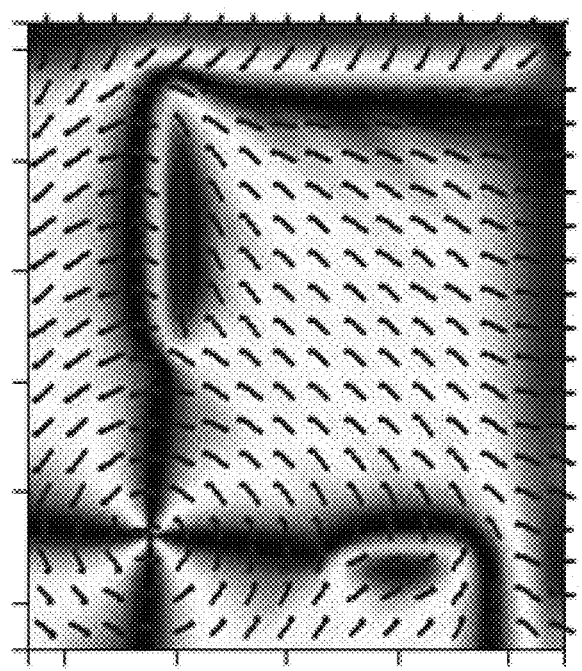
FIG. 15 is an enlarged view illustrating an upper right portion of FIG. 14.

FIG. 13 is a plan view illustrating a pixel electrode 2 in one pixel region of a display panel 102 of an example in which each of the sub slits 22 and 23 has a width of 3 μm, FIG. 14 is a plan view illustrating the light transmission state in the pixel region of the above example, and FIG. 15 is an enlarged view illustrating an upper right portion of FIG. 14.

The transmittance and the transmittance ratio in the above cases are illustrated in the above Tables 1 and 2.

Figure 16:
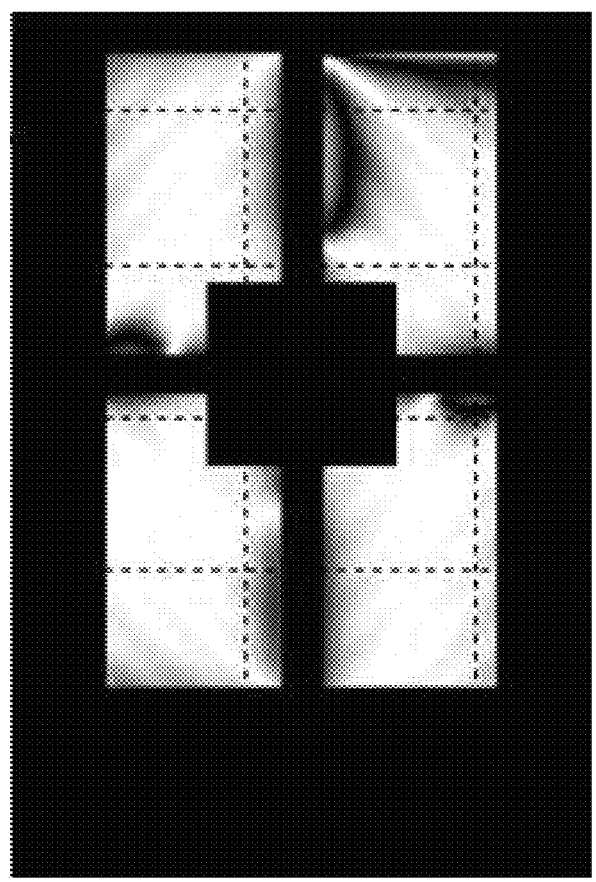
FIG. 16 is a plan view illustrating the light transmission state in one pixel region of a display panel of an example of which the sub slit has a width of 4 μm.

FIG. 16 is a plan view illustrating the light transmission state in one pixel region of a display panel 102 of an example in which each of the sub slits 22 and 23 has a width of 4 μm.

The transmittance and the transmittance ratio in the above cases are illustrated the above Tables 1 and 2.

By comparing light transmissive views of FIG. 5 (sub slit width 1.5 μm), FIG. 8 (the width 2 μm), FIG. 11 (the width 2.5 μm), FIG. 14 (the width 3 μm) and FIG. 16 (the width 4 μm) with the partially enlarged views of FIGS. 6, 9, 12 and 15, it can be seen that, as the width of the sub slit 22 becomes wider, the number of the liquid crystal molecules in the tilt direction is increased, the region in which the liquid crystal molecules are present becomes wider, and the liquid crystal domain boundary side portion of the dark line of the short side portion in the pixel region is more shifted to the short side. In a case of FIG. 15, since the number of the liquid crystal molecules at the boundary portion between the liquid crystal domains in a direction in which the sub slit 22 extends, not the tilt direction, is increased, the dark line occurs, such that the transmittance of light is more deteriorated than the display panel 102 of the example in FIG. 12. The reason is that, due to the width of the sub slit 22 becoming wider, the liquid crystal molecules lining up at an angle of 45° along the longitudinal edge part of the sub slit 22 collide with each other and fall almost completely horizontally, and thereby the liquid crystal molecules are aligned in the direction in which the sub slit 22 substantially extends, briefly, in the direction perpendicular or parallel to the polarizing axes. In a case of the example in FIG. 16, further, the width of the dark line becomes wider.

The transmittance of light is higher in an order of 2.5 μm, 2 μm, 3 μm, 1.5 μm and 4 μm of the width of the sub slits.

(2) When the Cell Gap is 2.5 μm

Figure 17:
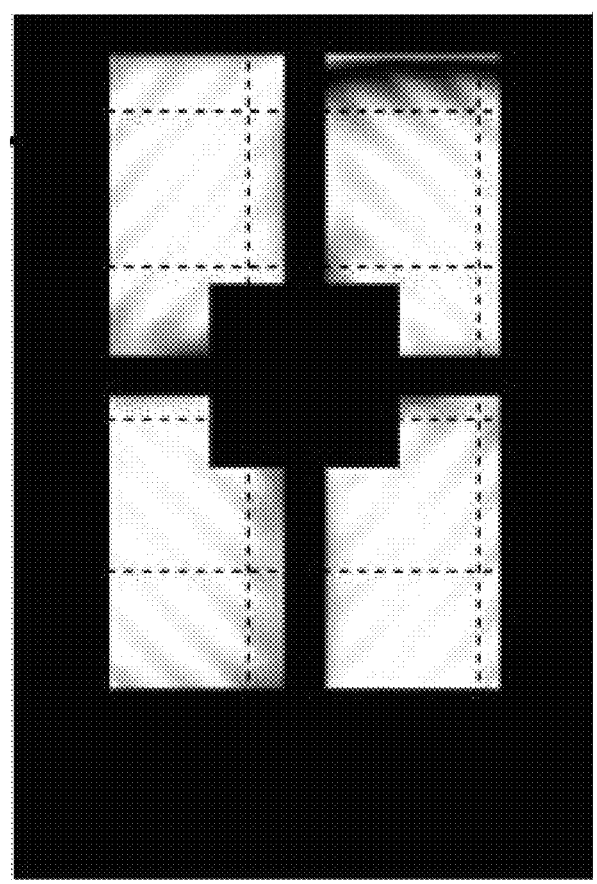
FIG. 17 is a plan view illustrating the light transmission state in one pixel region of an example using the pixel electrode in FIG. 2, of which the sub slit has a width of 1.5 μm when the cell gap is 2.5 μm.

When the cell gap is 2.5 μm, the light transmission state in one pixel region of an example using the pixel electrode 2 in FIG. 2, in which each of the sub slits 22 and 23 has a width of 1.5 μm, is illustrated in a plan view of FIG. 17, and the transmittance and the transmittance ratio are illustrated in the above Tables 1 and 2.

Figure 18:
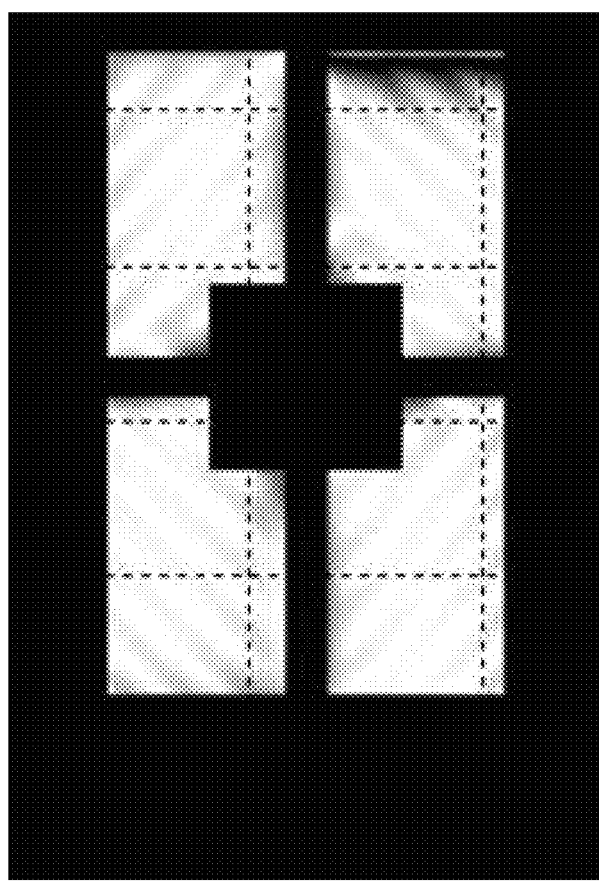
FIG. 18 is a plan view illustrating the light transmission state in one pixel region of an example using the pixel electrode in FIG. 7, of which the sub slit has a width of 2 μm.

The light transmission state in one pixel region of an example using the pixel electrode 2 in FIG. 7, in which each of the sub slits 22 and 23 has a width of 2 μm, is illustrated in a plan view of FIG. 18, and the transmittance and the transmittance ratio are illustrated in the above Tables 1 and 2.

Figure 19:
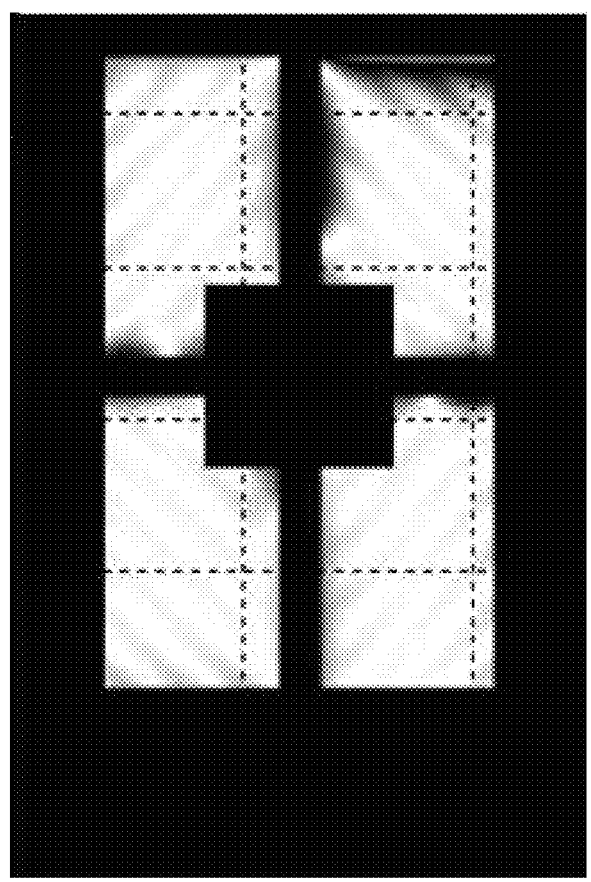
FIG. 19 is a plan view illustrating the light transmission state in one pixel region of an example using the pixel electrode in FIG. 10, of which the sub slit has a width of 2.5 μm.

The light transmission state in one pixel region of an example using the pixel electrode 2 in FIG. 10, in which each of the sub slits 22 and 23 has a width of 2.5 μm, is illustrated in a plan view of FIG. 19, and the transmittance and the transmittance ratio are illustrated in the above Tables 1 and 2.

Figure 20:
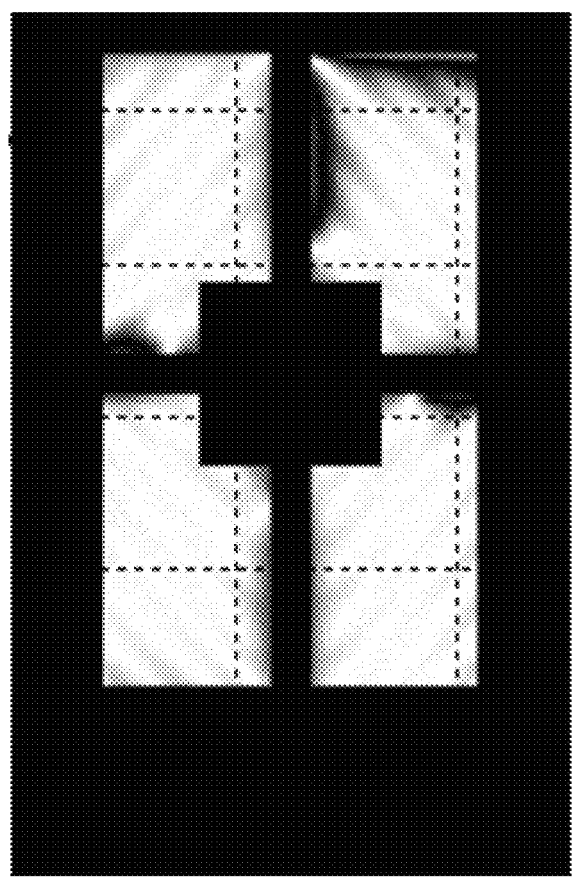
FIG. 20 is a plan view illustrating the light transmission state in one pixel region of an example using the pixel electrode in FIG. 13, of which the sub slit has a width of 3 μm.

The light transmission state in one pixel region of an example using the pixel electrode 2 in FIG. 13, in which each of the sub slits 22 and 23 has a width of 3 μm, is illustrated in a plan view of FIG. 20, and the transmittance and the transmittance ratio are illustrated in the above Tables 1 and 2.

Figure 21:
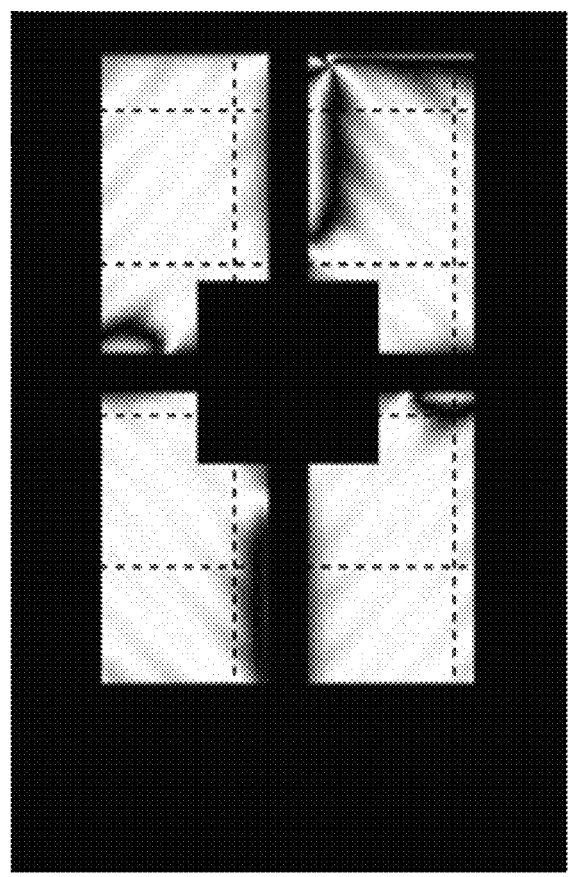
FIG. 21 is a plan view illustrating the light transmission state in one pixel region of a display panel of an example using a pixel electrode of which the sub slit has a width of 4 μm.

The light transmission state in one pixel region of an example using the pixel electrode 2 in which each of the sub slits 22 and 23 has a width of 4 μm is illustrated in a plan view of FIG. 21, and the transmittance and the transmittance ratio are illustrated in the above Tables 1 and 2.

By comparing light transmissive views of FIG. 17 (sub slit width 1.5 μm), FIG. 18 (the width 2 μm), FIG. 19 (the width 2.5 μm), FIG. 20 (the width 3 μm) and FIG. 21 (the width 4 μm) with each other, it can be seen that, as the width of the sub slits 22 and 23 becomes wider, the liquid crystal domain boundary side portion of the dark line of the short side portion or the long side portion in the pixel region is more shifted to the short side or the long side, and the width of a dark line which occurs at the boundary portion between the liquid crystal domains and extends in the direction in which the sub slits 22 and 23 extend becomes wider.

The transmittance of light is higher in an order of 2 μm, 2.5 μm, 1.5 μm, 3 μm and 4 μm of the width of the sub slits.

(3) When the Cell Gap is 2 μm

Figure 22:
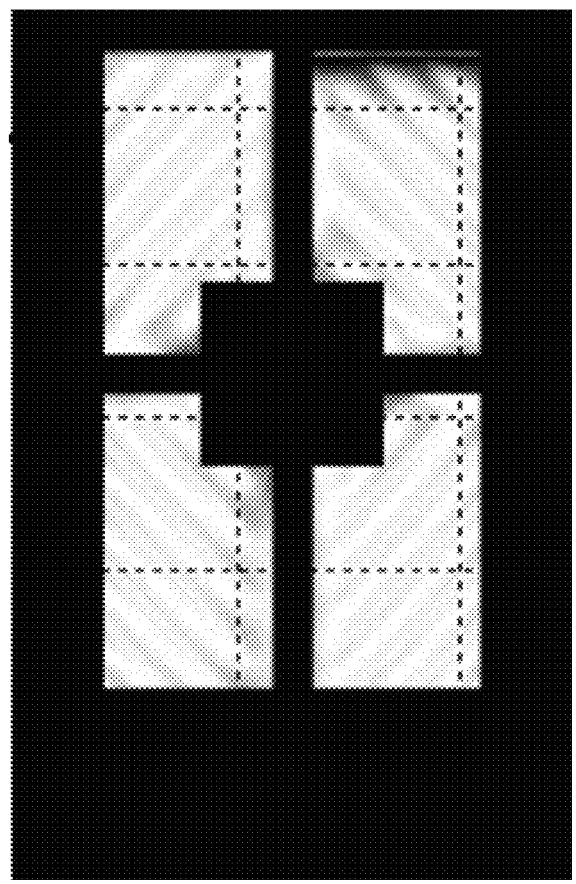
FIG. 22 is a plan view illustrating the light transmission state in one pixel region of an example using the pixel electrode in FIG. 2, of which the sub slit has a width of 1.5 μm when the cell gap is 2 μm.

When the cell gap is 2 μm, the light transmission state in one pixel region of an example using the pixel electrode 2 in FIG. 2, in which each of the sub slits 22 and 23 has a width of 1.5 μm, is illustrated in a plan view of FIG. 22, and the transmittance and the transmittance ratio are illustrated in the above Tables 1 and 2.

Figure 23:
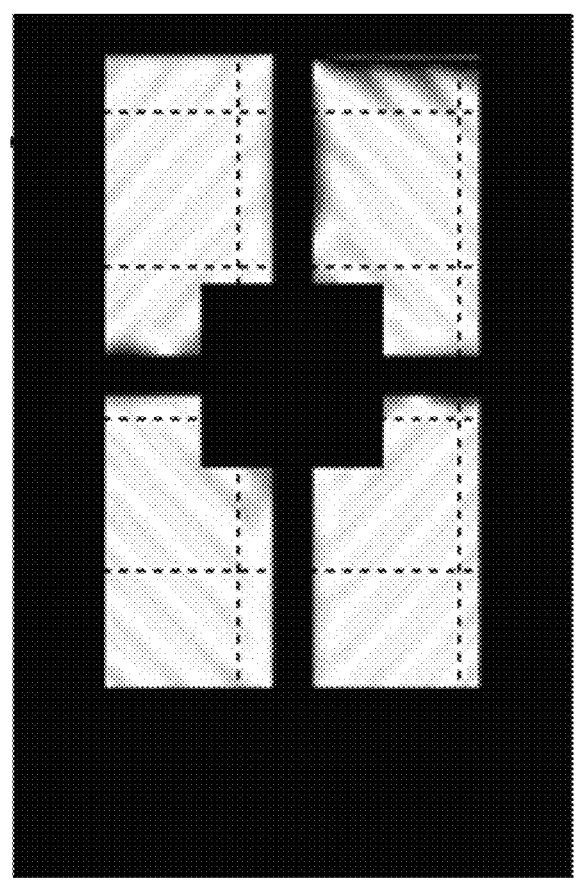
FIG. 23 is a plan view illustrating the light transmission state in one pixel region of an example using a pixel electrode 2 in FIG. 7, of which the sub slit has a width of 2 μm.

The light transmission state in one pixel region of an example using the pixel electrode 2 in FIG. 7, in which each of the sub slits 22 and 23 has a width of 2 μm, is illustrated in a plan view of FIG. 23, and the transmittance and the transmittance ratio are illustrated in the above Tables 1 and 2.

Figure 24:
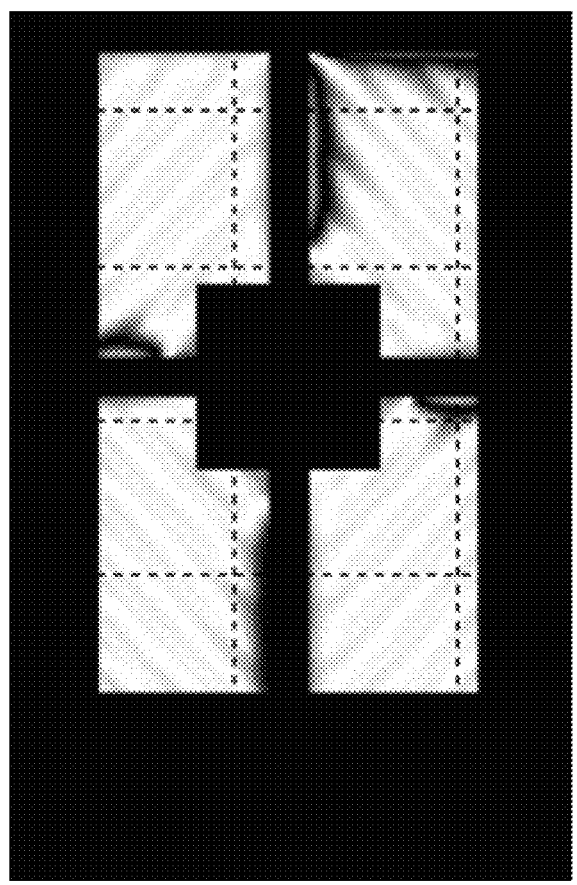
FIG. 24 is a plan view illustrating the light transmission state in one pixel region of an example using the pixel electrode 2 in FIG. 13, of which the sub slit has a width of 3 μm.

The light transmission state in one pixel region of an example using the pixel electrode 2 in FIG. 13, in which each of the sub slits 22 and 23 has a width of 3 μm, is illustrated in a plan view of FIG. 24, and the transmittance and the transmittance ratio are illustrated in the above Tables 1 and 2.

Figure 25:
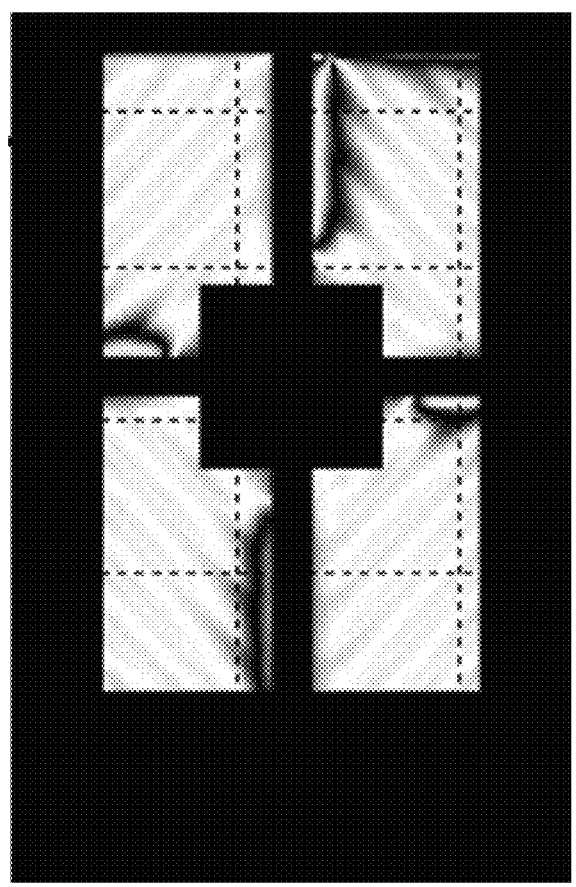
FIG. 25 is a plan view illustrating the light transmission state in one pixel region of a display panel of an example using a pixel electrode of which the sub slit has a width of 4 μm.

The light transmission state in one pixel region of an example using the pixel electrode 2 in FIG. 25, in which each of the sub slits 22 and 23 has a width of 4 μm, is illustrated in a plan view of FIG. 25, and the transmittance and the transmittance ratio are illustrated in the above Tables 1 and 2.

By comparing light transmissive views of FIG. 22 (sub slit width 1.5 μm), FIG. 23 (the width 2 μm), FIG. 24 (the width 3 μm) and FIG. 25 (the width 4 μm) with each other, it can be seen that, as the width of the sub slits 22 and 23 becomes wider, the liquid crystal domain boundary side portion of the dark line of the short side portion or the long side portion in the pixel region is more shifted to the short side or the long side, and the width of a dark line which occurs at the boundary portion between the liquid crystal domains and extends in the direction in which the sub slits 22 and 23 extend becomes wider.

The transmittance of light is higher in an order of 1.5 μm, 2 μm, 2.5 μm, 3 μm and 4 μm of the width of the sub slits.

Figure 26:
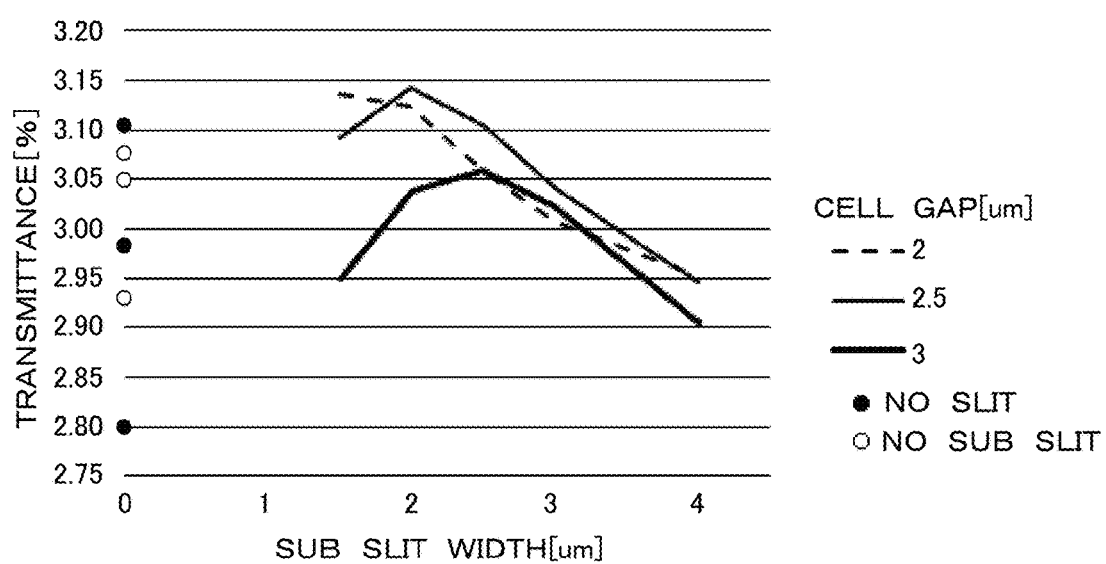
FIG. 26 is a graph illustrating a relationship between the width of the sub slit and the transmittance of the pixel electrode.

A relationship between the width of the sub slits 22 and 23 and the transmittance of the pixel electrode 2 are illustrated in a graph of FIG. 26. A horizontal axis of the graph in FIG. 26 represents the sub slit width [μm], and a vertical axis represents the transmittance [%]. The case of the cell gap being 2 μm is illustrated by a broken line, the case of the cell gap being 2.5 μm is illustrated by a thin solid line, and the case of the cell gap being 3 μm is illustrated by a thick solid line. When there is no sub slit (VATN mode), the transmittance is illustrated by ●, and when there is only the main slit, the transmittance is illustrated by ○.

Figure 27:
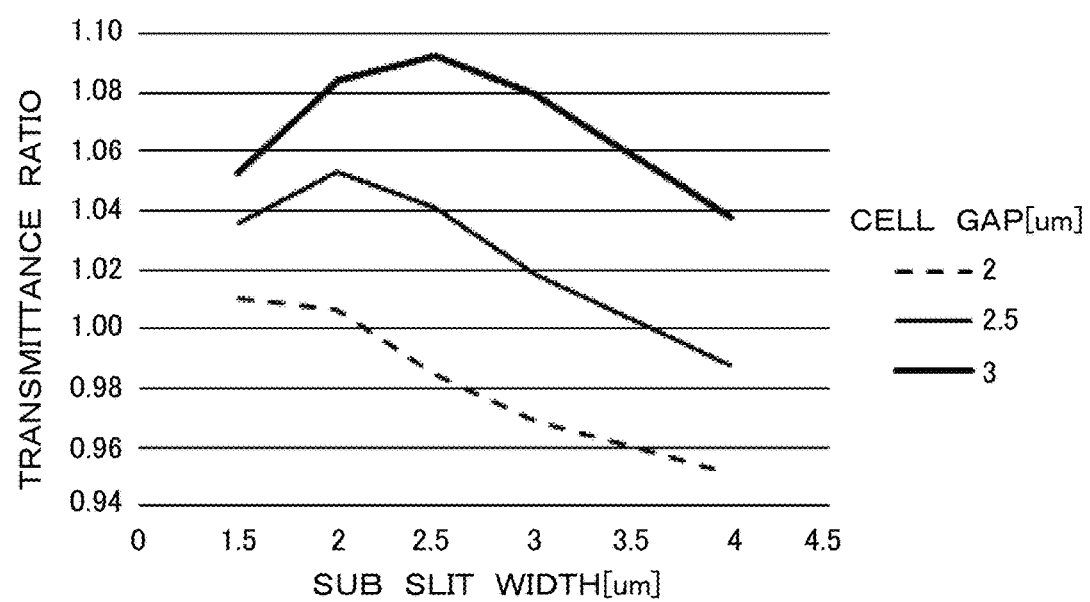
FIG. 27 is a graph illustrating a relationship between the width of the sub slit and a transmittance ratio of the pixel electrode.

The relationship between the width of the sub slits 22 and 23 and the transmittance ratio of the pixel electrode 2 are illustrated in a graph of FIG. 27. A horizontal axis of the graph in FIG. 27 represents the sub slit width [μm], and a vertical axis represents the transmittance ratio [%]. The case of the cell gap being 2 μm is illustrated by a broken line, the case of the cell gap being 2.5 μm is illustrated by a thin solid line, and the case of the cell gap being 3 μm is illustrated by a thick solid line.

From FIGS. 26 and 27, and Tables 1 and 2, it can be seen that, even in any case of the cell gaps being 2 μm, 2.5 μm and 3 μm, when the width of the sub slits 22 and 23 is the width or more of the main slit 21 and or less of the cell gap, the transmittance of light is more improved than a case of having neither the main slit 21 nor the sub slits 22 and 23, and a case of having the main slit 21 while without the sub slits 22 and 23.

Embodiment 2

A pixel electrode 2 of a display panel 102 according to Embodiment 2 has the same configuration as the display panel 102 according to Embodiment 1, except that the sub slits 24 and 25 are provided at central parts in the width direction between the liquid crystal domains.

Figure 28:
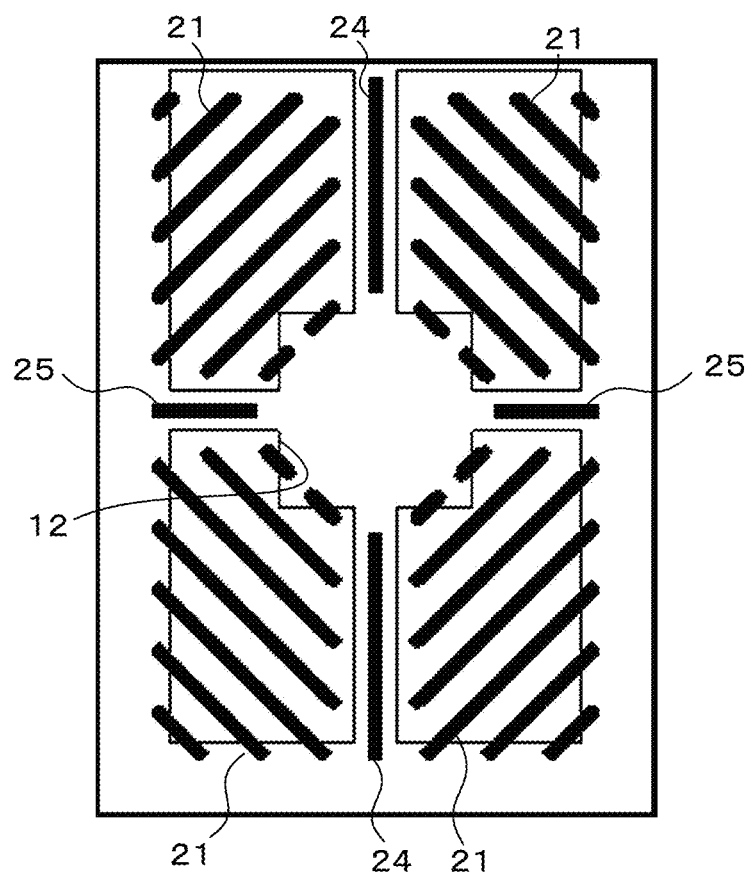
FIG. 28 is a plan view illustrating a pixel electrode according to Embodiment 2.

FIG. 28 is a plan view illustrating the pixel electrode 2 according to Embodiment 2.

As described above, the sub slit 24 of the pixel electrode 2 according to the present example is provided at the central part in the width direction of the boundary between the liquid crystal domains A and B, and the boundary between the liquid crystal domains C and D, and the sub slit 25 is provided at the central part in the width direction of the boundary between the liquid crystal domains A and C, and the boundary between the liquid crystal domains B and D.

A main slit 21 of the pixel electrode 2 in FIG. 28 has a width of 1.5 μm, and a pitch of 5.5 μm. Each of the sub slits 24 and 25 has a width of 1.5 μm.

EXAMPLES

Hereinafter, examples according to Embodiment 2 will be described in detail, however the present disclosure is not limited to the examples.

(1) When the Cell Gap is 3 μm

Figure 29:
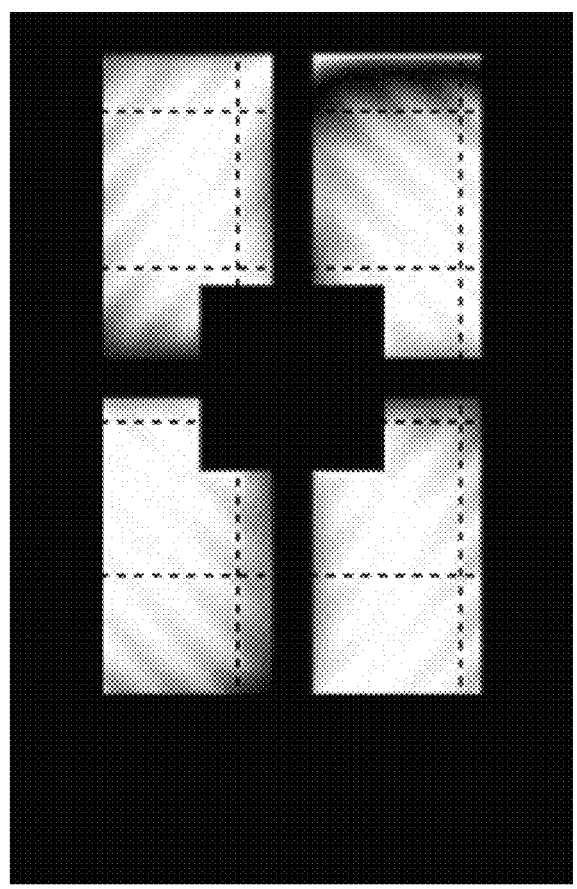
FIG. 29 is a plan view illustrating the light transmission state in one pixel region of an example using the pixel electrode in FIG. 28.

In the display panel 102 configured as described above, when the distance (cell gap) between the active matrix substrate 1 and the CF substrate 7 is 3 μm, the light transmission state in one pixel region of an example using the above-described pixel electrode 2 in FIG. 28 is illustrated in a plan view of FIG. 29. FIG. 29 illustrates a state in which the wiring and the contact hole are disposed.

As described above, each of the sub slits 24 and 25 has a width of 1.5 μm.

In the present example, metal wirings (the Cs wiring 32, the gate wirings 31, and the drain electrode 35) of the active matrix substrate 1 are configured to be located on a region of the dark line occurring at the boundary between the liquid crystal domains, thereby suppressing transmission loss of light.

The liquid crystal molecules are aligned in the tilt direction. By providing the main slit 21, the liquid crystal molecules lining up along the longitudinal edge part of the main slit 21 collide with each other and fall, and are arranged so as to be laid along the direction in which the main slit 21 extends, and thereby the alignment of the liquid crystal molecules are aligned. Herein, this effect is larger when the main slit 21 has a narrow width.

By providing the sub slits 24 and 25, the liquid crystal molecules lining up at an angle of 45° along the longitudinal edge part of the sub slit 24 collide with each other and are horizontally tilted, and the number of the liquid crystal molecules in the tilt direction is increased, and thereby a region in which the liquid crystal molecules are present becomes wider. That is, the alignment of the liquid crystal molecules in the short side or the long side of the pixel region is disturbed, and is aligned. As a result, a portion of the dark line on the liquid crystal domain boundary side of the short side portion or the long side portion of the pixel region is shifted to the short side or the long side of the pixel region.

By comparing FIG. 29 with the light transmission state in the pixel region of the conventional display panels illustrated in FIG. 37 (without slit) and FIG. 39 (without sub slit), it can be seen that, in the display panel 102 according to the present example, an occurrence of the dark line may be suppressed well.

The following Table 3 illustrates the transmittance of the display panel 102 of the present example and the above-described conventional display panel of FIG. 37. In addition, Table 4 illustrates a ratio (transmittance ratio) of the transmittance of the display panel of the present example in the case in which the transmittance of display panel of FIG. 37 is set to be 1.00. Further, each of the transmittance ratios of the following examples illustrates a ratio of the transmittance of the display panel of each example in the case in which the transmittance of display panel of the VATN mode in each cell gap is set to be 1.00.

TABLE 3

|  | | SUB SLIT WIDTH | | | | NO SLIT |
|---|---|---|---|---|---|---|
|  |  | 1.5 | 2 | 2.5 | 3 | 4 | 0 |
| CELL GAP | 2 | 3.10 | 3.11 | 3.07 | 3.01 | 2.94 | 3.10 |
|  | 2.5 | 3.05 | 3.10 | 3.09 | 3.04 | 2.94 | 2.98 |
|  | 3 | 2.92 | 2.98 | 3.03 | 3.00 | 2.90 | 2.80 |

TABLE 4

|  | | SUB SLIT WIDTH | | | | |
|---|---|---|---|---|---|---|
|  |  | 1.5 | 2 | 2.5 | 3 | 4 |
| CELL GAP | 2 | 1.00 | 1.00 | 0.99 | 0.97 | 0.95 |
|  | 2.5 | 1.02 | 1.04 | 1.04 | 1.02 | 0.99 |
|  | 3 | 1.04 | 1.06 | 1.08 | 1.07 | 1.04 |

From Table 3, it can be seen that the display panel 102 of the present example has improved transmittance compared to the conventional display panel.

Accordingly, the liquid crystal display apparatus 100 including the display panel 102 has excellent image quality.

Figure 30:
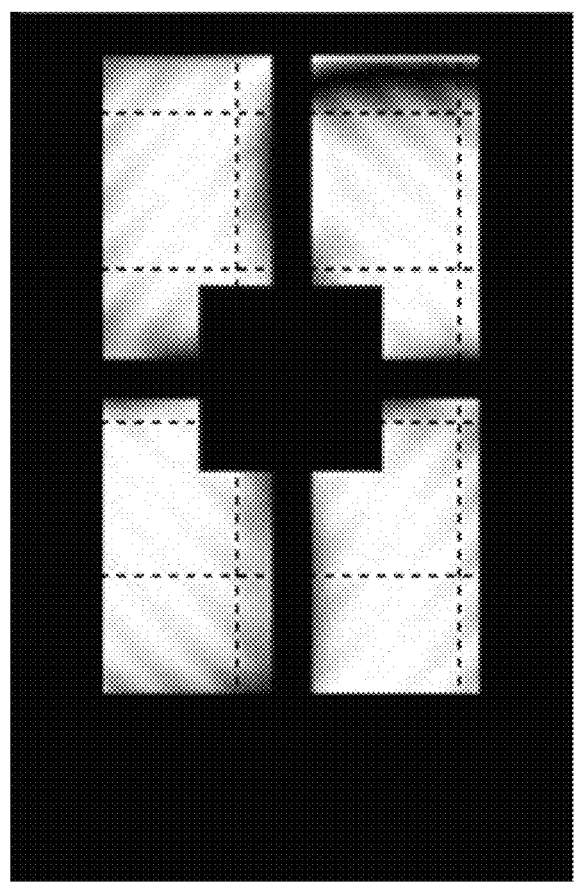
FIG. 30 is a plan view illustrating the light transmission state in one pixel region of a display panel of an example of which the sub slit has a width of 2 μm.
Figure 31:
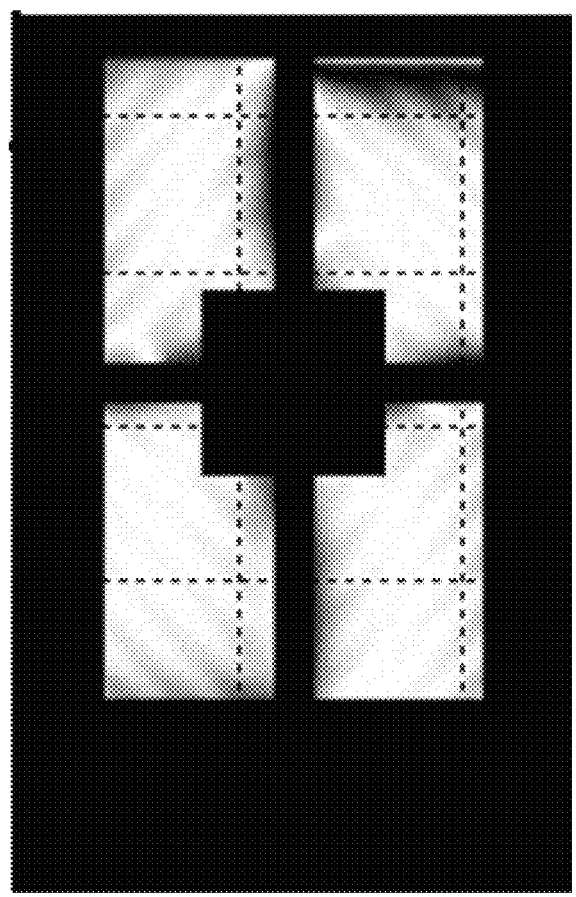
FIG. 31 is a plan view illustrating the light transmission state in one pixel region of a display panel of an example of which the sub slit has a width of 2.5 μm.
Figure 32:
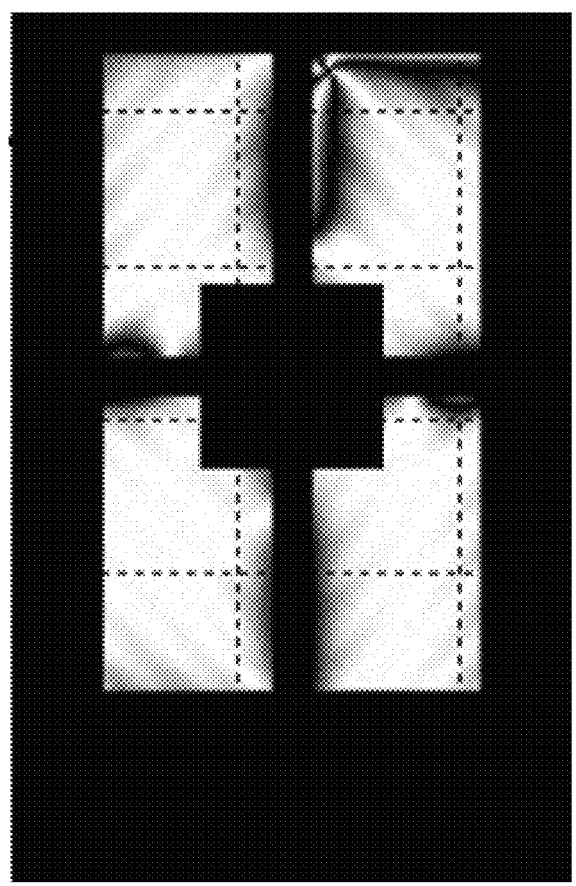
FIG. 32 is a plan view illustrating the light transmission state in one pixel region of a display panel of an example of which the sub slit has a width of 3 μm.
Figure 33:
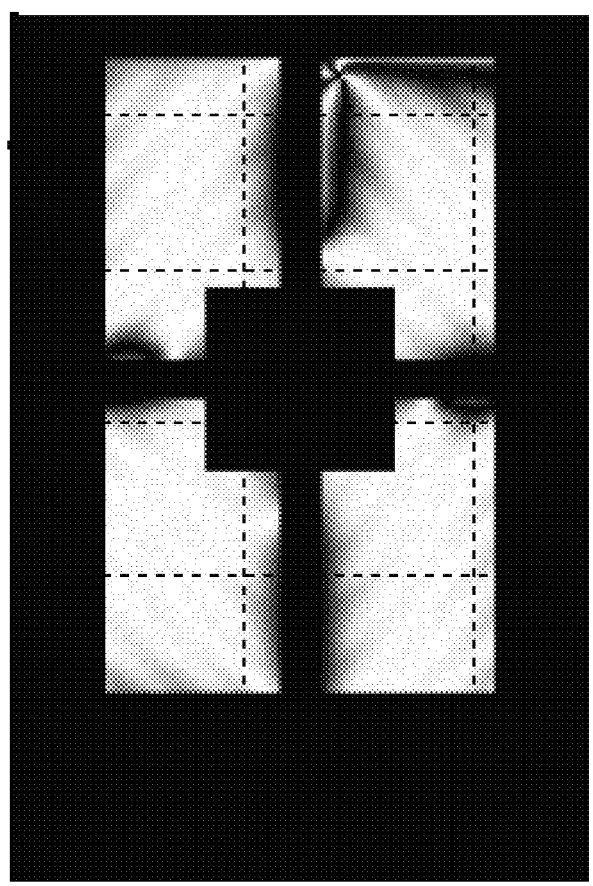
FIG. 33 is a plan view illustrating the light transmission state in one pixel region of a display panel of an example of which the sub slit has a width of 4 μm.

FIG. 30 is a plan view illustrating the light transmission state in one pixel region of a display panel 102 of an example in which each of the sub slits 24 and 25 has a width of 2 μm, FIG. 31 is a plan view illustrating the light transmission state in one pixel region of a display panel 102 of an example in which each of the sub slits 24 and 25 has a width of 2.5 μm, FIG. 32 is a plan view illustrating the light transmission state in one pixel region of a display panel 102 of an example in which each of the sub slits 24 and 25 has a width of 3 μm, and FIG. 33 is a plan view illustrating the light transmission state in one pixel region of a display panel 102 of an example in which each of the sub slits 24 and 25 has a width of 4 μm. The respective transmittance and the transmittance ratio are illustrated in the above Tables 3 and 4.

From light transmissive views of FIG. 29 (sub slit width 1.5 μm), FIG. 30 (the width 2 μm), FIG. 31 (the width 2.5 μm), FIG. 32 (the width 3 μm) and FIG. 33 (the width 4 μm) with each other, it can be seen that, as the width of the sub slits 24 and 25 becomes wider, the number of the liquid crystal molecules in the tilt direction is increased, the region in which the liquid crystal molecules are present becomes wider, and the liquid crystal domain boundary side portion of the dark line of the short side portion or the long side portion in the pixel region is more shifted to the short side or the long side. In a case of FIGS. 32 and 33, since the number of the liquid crystal molecules at the boundary portion between the liquid crystal domains in a direction in which the sub slits 24 and 25 extend, not the tilt direction, is increased, the dark line occurs, such that the transmittance of light is more deteriorated than the display panel 102 of the example in FIG. 31.

The transmittance of light is higher in an order of 2.5 μm, 3 μm, 2 μm, 1.5 μm and 4 μm of the width of the sub slits 24 and 25.

(2) When the Cell Gap is 2.5 μm

When the cell gap is 2.5 μm in the display panel 102 according to Embodiment 2, the transmittance and the transmittance ratio of each example, in which the width of the sub slits 24 and 25 is changed to 1.5 μm, 2 μm, 2.5 μm, 3 μm and 4 μm, are illustrated in the above Tables 3 and 4.

The transmittance of light is higher in an order of 2 μm, 2.5 μm, 1.5 μm, 3 μm and 4 μm of the width of the sub slits 24 and 25.

(3) When the Cell Gap is 2 μm

When the cell gap is 2 μm in the display panel 102 according to Embodiment 2, the transmittance and the transmittance ratio of each example, in which the width of the sub slits 24 and 25 is changed to 1.5 μm, 2 μm, 2.5 μm, 3 μm and 4 μm, are illustrated in the above Tables 3 and 4.

The transmittance of light is higher in an order of 2 μm, 1.5 μm, 2.5 μm, 3 μm and 4 μm of the width of the sub slits 24 and 25.

Figure 34:
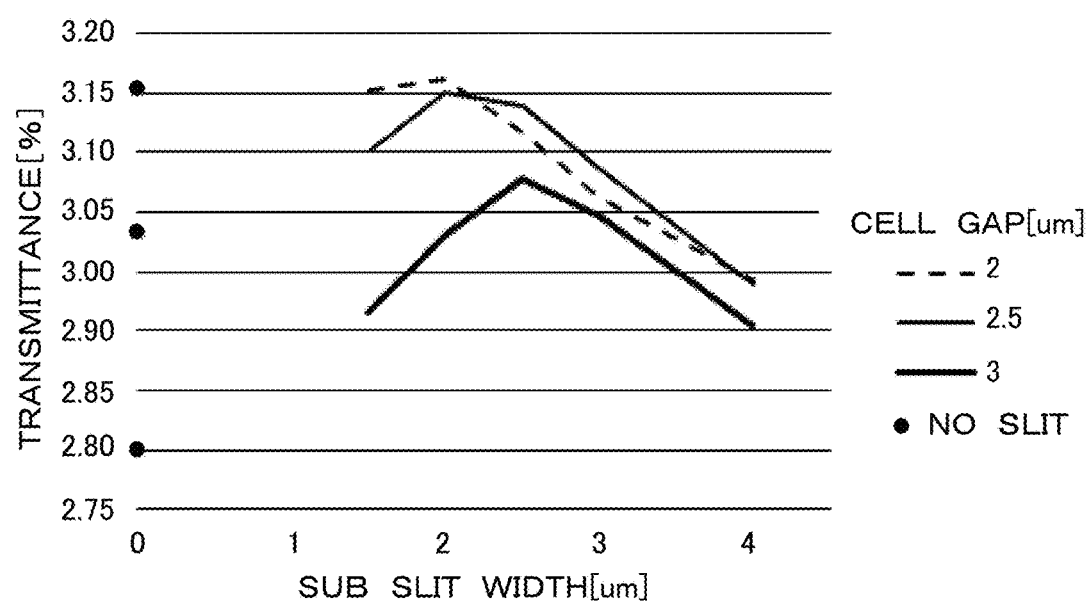
FIG. 34 is a graph illustrating a relationship between the width of the sub slit and the transmittance of the pixel electrode.

A relationship between the width of the sub slits 24 and 25 and the transmittance ratio of the pixel electrode 2 are illustrated in a graph of FIG. 34. A horizontal axis of the graph in FIG. 34 represents the sub slit width [μm], and a vertical axis represents the transmittance [%]. The case of the cell gap being 2 μm is illustrated by a broken line, the case of the cell gap being 2.5 μm is illustrated by a thin solid line, and the case of the cell gap being 3 μm is illustrated by a thick solid line. When there is no sub slit (VATN mode), the transmittance is illustrated by ●.

Figure 35:
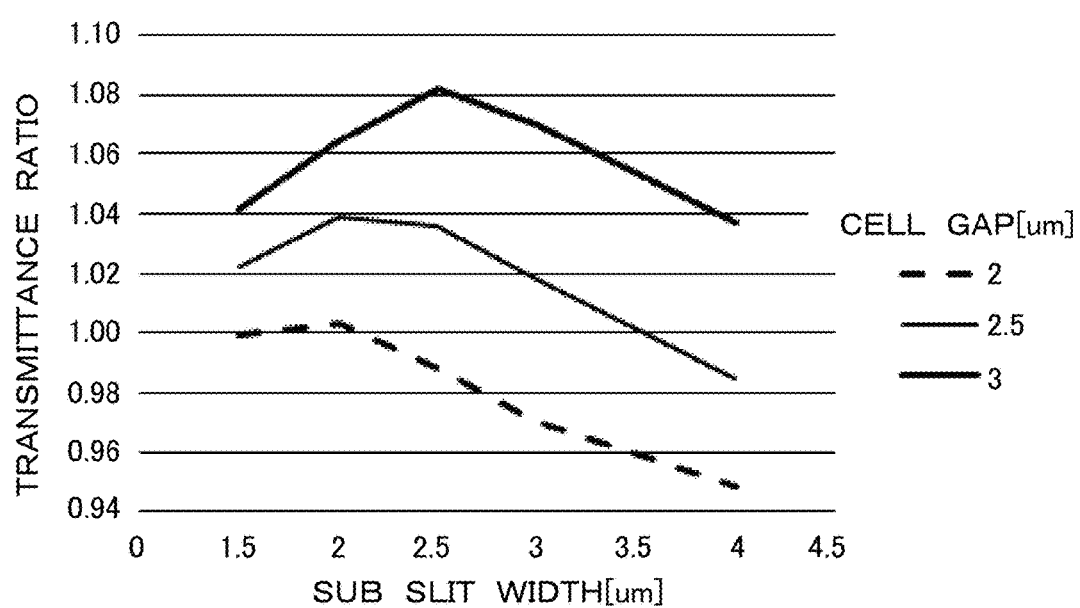
FIG. 35 is a graph illustrating a relationship between the width of the sub slit and the transmittance ratio of the pixel electrode.
Figure 36:
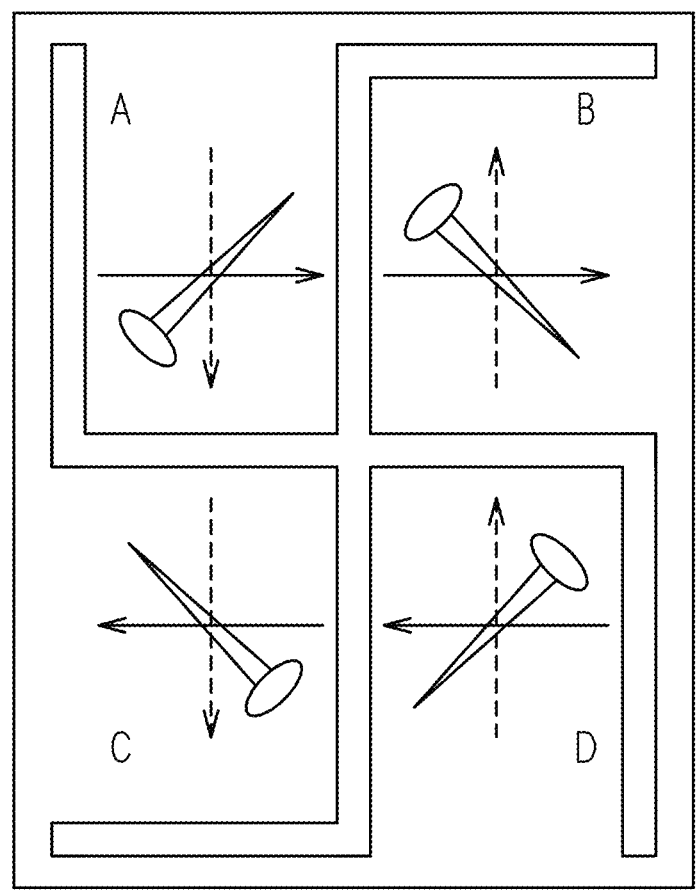
FIG. 36 is a plan view illustrating a pixel region of the VATN mode liquid crystal display apparatus having a 4D structure.

The relationship between the width of the sub slits 24 and 25 and the transmittance ratio of the pixel electrode 2 are illustrated in a graph of FIG. 35. A horizontal axis of the graph in FIG. 35 represents the sub slit width [μm], and a vertical axis represents the transmittance [%]. The case of the cell gap being 2 μm is illustrated by a broken line, the case of the cell gap being 2.5 μm is illustrated by a thin solid line, and the case of the cell gap being 3 μm is illustrated by a thick solid line.

From FIGS. 34 and 35, and Tables 3 and 4, it can be seen that, even in any case of the cell gaps being 2 μm, 2.5 μm and 3 μm, when the width of the sub slits 24 and 25 is the width or more of the main slit 21 and or less of the cell gap, the transmittance of light is more improved than a case of having neither the main slit 21 nor the sub slits 24 and 25.

By comparing the examples according to Embodiment 1 and Embodiment 2 with each other, it can be seen that the pixel electrode 2 according to Embodiment 1 has better transmittance of light than the pixel electrode 2 according to Embodiment 2. That is, the pixel electrode 2 according to Embodiment 1, in which the sub slits 22 and 23 are provided by deflecting from the central portion of the boundary between the liquid crystal domains, has higher transmittance. The reason is that, when the sub slits 22 and 23 are deflected to the side (end part of the CF substrate 7 side) in which the head parts of the liquid crystal molecules face each other at the central part in the thickness direction of the liquid crystal layer 6, the slits are provided corresponding to the portion occurring the dark line, such that an occurrence of the dark line is efficiently suppressed.

Further, it should be understood that the present disclosure is not limited to the above-described Embodiments 1 and 2, and various modifications may be made within the scope defined by the appended claims. That is, embodiments obtained by combining technical means appropriately modified within the scope defined by the appended claims are also included in the technical scope of the present disclosure.

For example, the sub slits 22 and 23, and 24 and 25 are not limited to the case of being provided in continuity, however they may be intermittently provided. In addition, it is also not limited to the case of having a uniform width, however the position of the liquid crystal molecule may be easily determined, such that it is preferable to have a uniform width. Further, the sub slits 22 and 23, and 24 and 25 may be continued to one main slit 21 on one end part side.

Furthermore, the shape of the main slit 21, the sub slits 22 and 23, and 24 and 25 is not limited to the case of the rounded corner rectangular shape, and may be an elliptical shape or rectangular shape.

It is to be noted that, as used herein and in the appended claims, the singular forms "a", "an", and "the" include plural referents unless the context clearly dictates otherwise.

The invention claimed is:

1. A liquid crystal display apparatus comprising:

two substrates each of which has at least one electrode and a photo alignment film sequentially formed on one surface and one surfaces of which face to each other;

a liquid crystal layer which includes a vertical alignment type liquid crystal material, and is interposed between both photo alignment films; and a plurality of pixel regions formed on the substrate in a matrix in a planar direction of the substrate, wherein each pixel region includes a plurality of liquid crystal domains each of which has respectively different standard alignment direction defined by the photo alignment films, one substrate has a pixel electrode in each pixel region, the pixel electrode has a plurality of first opening parts each of which extends parallel to each standard alignment direction in each region corresponding to each liquid crystal domain, the pixel electrode has at least one second opening part extending between adjacent two liquid crystal domains in a direction orthogonal to the direction in which the two liquid crystal domains line up, the second opening part has a width of a width or more of the first opening part, and the second opening part is provided at the position deflected from a central portion between the two liquid crystal domains, between which the second opening part is being put, to the one liquid crystal domain side.

2. The liquid crystal display apparatus according to claim 1, wherein the second opening part has a width of an interval or less between the two substrates.

3. The liquid crystal display apparatus according to claim 1, wherein each pixel region includes four liquid crystal domains each of which has respectively different standard alignment direction defined by the photo alignment films, wherein among the four liquid crystal domains, the first domain and the second domain line up in a first direction;

the third domain and the fourth domain line up in the first direction;

the first domain and the third domain line up in a second direction which is orthogonal to the first direction; and the second domain and the fourth domain line up in the second direction; wherein the pixel electrode has the second opening parts extending in the second direction between the first domain and the second domain and between the third domain and the fourth domain; and the pixel electrode has the second opening parts extending in the first direction between the first domain and the third domain and between the second domain and the fourth domain.

4. The liquid crystal display apparatus according to claim 2, wherein each pixel region includes four liquid crystal domains each of which has respectively different standard alignment direction defined by the photo alignment films, wherein among the four liquid crystal domains, the first domain and the second domain line up in a first direction;

the third domain and the fourth domain line up in the first direction;

the first domain and the third domain line up in a second direction which is orthogonal to the first direction; and the second domain and the fourth domain line up in the second direction; wherein the pixel electrode has the second opening parts extending in the second direction between the first domain and the second domain and between the third domain and the fourth domain; and the pixel electrode has the second opening parts extending in the first direction between the first domain and the third domain and between the second domain and the fourth domain.

* * * * *